United States Patent
Okada

(10) Patent No.: US 11,979,670 B2
(45) Date of Patent: May 7, 2024

(54) IMAGE PROCESSING APPARATUS, IMAGING APPARATUS, IMAGE PROCESSING METHOD, AND PROGRAM FOR BLENDING PLURALITY OF IMAGE SIGNALS BASED ON A PEAKING SIGNAL

(71) Applicant: Sony Group Corporation, Tokyo (JP)

(72) Inventor: Sohhei Okada, Tokyo (JP)

(73) Assignee: Sony Group Corporation, Tokyo (JP)

( * ) Notice: Subject to any disclaimer, the term of this patent is extended or adjusted under 35 U.S.C. 154(b) by 160 days.

(21) Appl. No.: 17/624,931

(22) PCT Filed: May 24, 2020

(86) PCT No.: PCT/JP2020/020434
§ 371 (c)(1),
(2) Date: Jan. 5, 2022

(87) PCT Pub. No.: WO2021/010020
PCT Pub. Date: Jan. 21, 2021

(65) Prior Publication Data
US 2022/0286607 A1 Sep. 8, 2022

(30) Foreign Application Priority Data
Jul. 17, 2019 (JP) .................. 2019-131786

(51) Int. Cl.
*H04N 5/335* (2011.01)
*G06T 5/20* (2006.01)
(Continued)

(52) U.S. Cl.
CPC ............ *H04N 23/951* (2023.01); *G06T 5/20* (2013.01); *G06T 5/50* (2013.01); *G06T 7/13* (2017.01);
(Continued)

(58) Field of Classification Search
CPC ................................ H04N 23/951
See application file for complete search history.

(56) References Cited

U.S. PATENT DOCUMENTS

2009/0160941 A1  6/2009  Sun
2013/0250145 A1* 9/2013  Miura .................. H04N 23/815
                                                                348/239

(Continued)

FOREIGN PATENT DOCUMENTS

CN    101616237 A    12/2009
CN    103260039 A     8/2013
(Continued)

OTHER PUBLICATIONS

International Search Report dated Jul. 28, 2020 in PCT/JP2020/020434 filed May 24, 2020, 2 pages.

*Primary Examiner* — Gary C Vieaux
(74) *Attorney, Agent, or Firm* — Oblon, McClelland, Maier & Neustadt, L.L.P.

(57) ABSTRACT

An image capable of confirming a focus position is generated without superimposing a peaking signal on a captured image. Therefore, an image processing apparatus according to the present technology includes an image signal generation unit that generates a plurality of image signals having frequency characteristics different from each other from one captured image signal, and a blending processing unit that blends the plurality of image signals on the basis of a blend ratio determined on the basis of a peaking signal for the one captured image signal.

19 Claims, 12 Drawing Sheets

(51) Int. Cl.
*G06T 5/50* (2006.01)
*G06T 7/13* (2017.01)
*H04N 23/63* (2023.01)
*H04N 23/667* (2023.01)
*H04N 23/951* (2023.01)

(52) U.S. Cl.
CPC ........... *H04N 23/63* (2023.01); *H04N 23/667* (2023.01); *G06T 2207/20221* (2013.01)

(56) References Cited

U.S. PATENT DOCUMENTS

| | | |
|---|---|---|
| 2017/0034495 A1 | 2/2017 | Miura |
| 2017/0365039 A1 | 12/2017 | Tatsumi |
| 2018/0048812 A1* | 2/2018 | Tanioka ............... H04N 23/673 |

FOREIGN PATENT DOCUMENTS

| | | |
|---|---|---|
| CN | 104184929 A | 12/2014 |
| CN | 106296625 A | 1/2017 |
| JP | 2011-176788 A | 9/2011 |
| JP | 2012-160942 A | 8/2012 |
| JP | 2013-201703 A | 10/2013 |
| JP | 2016-100883 A | 5/2016 |
| JP | 2016-219920 A | 12/2016 |
| JP | 2017-34481 A | 2/2017 |
| WO | WO-2016163324 A1 | 10/2016 |

\* cited by examiner

HIGH-RESOLUTION IMAGE — HIGH FREQUENCY / LOW FREQUENCY

DOWN-CONVERTED IMAGE — HIGH FREQUENCY / LOW FREQUENCY

IMAGE WITH DOWN CONVERSION
+HIGH FREQUENCY COMPONENTS REMOVED

IMAGE BY MONITOR OUTPUT SIGNAL FROM BLENDING UNIT

IMAGE PROCESSING APPARATUS, IMAGING APPARATUS, IMAGE PROCESSING METHOD, AND PROGRAM FOR BLENDING PLURALITY OF IMAGE SIGNALS BASED ON A PEAKING SIGNAL

TECHNICAL FIELD

The present technology relates to a technical field of an image processing apparatus, an imaging apparatus, an image processing method, and a program that generate an image signal for monitor output. In particular, the present technology relates to an imaging apparatus, an imaging signal processing apparatus, and an imaging signal processing method that generate an image signal for an image in which a degree of focus can be confirmed.

BACKGROUND ART

Some imaging apparatuses include a monitor output for checking brightness, white balance, and the like of an image being captured in real-time. For this purpose, it is desirable that the image displayed on the monitor can faithfully express the luminance, white balance, and resolution of the captured image. However, in an imaging apparatus having many high-resolution imaging sensors, it is difficult to have a display system with the number of pixels equal to or larger than that of the imaging sensor from the viewpoint of cost and miniaturization. Therefore, in the display system included in such an imaging apparatus, it is difficult to express the original sense of resolution and focus position.

Patent Document 1 discloses a technique of expressing a focus position by superimposing a peaking signal detected in a high-resolution region on a captured image with reduced resolution.

CITATION LIST

Patent Document

Patent Document 1: Japanese Patent Application Laid-Open No. 2011-176788

SUMMARY OF THE INVENTION

Problems to be Solved by the Invention

However, in a case where a peaking signal is superimposed and displayed on an image to be captured, there is a possibility that it becomes difficult to see depending on an imaging target (subject), and there is a case where a user feels resistance to use.

Therefore, an object of the present technology is to generate an image in which a focus position can be confirmed without superimposing a peaking signal on an image to be captured.

Solutions to Problems

An image processing apparatus according to the present technology includes: an image signal generation unit that generates a plurality of image signals having frequency characteristics different from each other from one captured image signal; and a blending processing unit that blends the plurality of image signals on the basis of a blend ratio determined on the basis of a peaking signal for the one captured image signal.

The image signals having frequency characteristics different from each other are, for example, an image signal including a high-frequency component and an image signal from which the high-frequency component has been removed.

The image signal generation unit in the above-described image processing apparatus may include a first resolution conversion processing unit that performs resolution conversion processing of converting an input image signal having a first resolution into an output signal having a second resolution.

The first resolution is, for example, 4K resolution (3840 horizontal pixels and 2160 vertical pixels), and the second resolution is, for example, HD resolution (1280 horizontal pixels and 720 vertical pixels). Alternatively, the first resolution may be 8K resolution (7680 horizontal pixels and 4320 vertical pixels), and the second resolution may be 4K resolution, 2K resolution (1920 horizontal pixels and 1080 vertical pixels), or HD resolution.

The plurality of image signals in the above-described image processing apparatus may include a first image signal and a second image signal, and the first image signal may be an image signal that includes a high-frequency component more than the second image signal.

One image signal is an image including more high-frequency components than the other image signal, and the amount of high-frequency components included in each portion of the display image can be changed by changing the blend ratio of the image signal for each portion of the display image.

The first image signal in the above-described image processing apparatus may be an image signal that does not pass through a band-limiting filter, and the second image signal may be an image signal that passes through a low pass filter.

The first image signal is often used for the focus position in the display image. Furthermore, the second image signal is often used for a portion other than the focus position in the display image.

The first image signal in the above-described image processing apparatus may be an image signal that passes through a high pass filter, and the second image signal may be an image signal that does not pass through a band-limiting filter.

The first image signal is an image signal in which a high-frequency component is emphasized through a high pass filter.

The first image signal in the above-described image processing apparatus may be an image signal that passes through a high pass filter, and the second image signal may be an image signal that passes through a low pass filter.

The first image signal is an image signal in which a high-frequency component is emphasized by passing through a high pass filter, and the second image signal is an image signal in which a low-frequency component is emphasized by passing through a low pass filter.

The above-described image processing apparatus may further include a high frequency band edge detection unit that extracts an edge detection signal in a high frequency band from the one captured image signal as the peaking signal.

That is, the image processing apparatus includes a high frequency band edge detection unit.

The high frequency band edge detection unit in the above-described image processing apparatus may include a second resolution conversion processing unit that performs resolution conversion processing in a state where edge information in a high frequency band is maintained.

As a result, the peaking signal used for determining the blend ratio is a signal down-converted without removing the high-frequency component.

The high frequency band edge detection unit in the above-described image processing apparatus may include a band control unit that controls the high frequency band on the basis of lens information regarding a lens used for imaging.

The lens information may be, for example, positional information of the zoom lens, information such as an F value, or a lens model number that can specify the information.

The blending processing unit in the above-described image processing apparatus may perform α blending on the basis of the blend ratio.

As a result, two image signals having different frequency characteristics are synthesized by the blending processing unit.

An imaging apparatus according to the present technology includes: an imaging element with a first number of pixels; a display unit with a second number of pixels that is smaller than the first number of pixels; an image signal generation unit that generates a plurality of image signals having frequency characteristics different from each other from one captured image signal output from the imaging element; and a blending processing unit that performs blending of the plurality of image signals on the basis of a blend ratio determined on the basis of a peaking signal to generate an image signal to be output to the display unit.

For example, the first number of pixels is the number of pixels based on horizontal 3840 pixels and vertical 2160 pixels that are 4K resolution, and the second number of pixels is the number of pixels based on horizontal 1280 pixels and vertical 720 pixels that are HD resolution.

The above-described imaging apparatus may further include a switching processing unit configured to switch between a mode in which an output from the blending processing unit is input to the display unit and a mode in which an output from the resolution conversion processing unit is input to the display unit without passing through the blending processing unit.

An operator for switching may be provided corresponding to the switching processing unit. The operator may be, for example, an operator such as a physical button, or an operator for operating the menu screen by being switchable from the menu screen may operate as the switching operator. Furthermore, in a case where the display unit is equipped with a touch panel, the display unit may operate as a switching operator. That is, the mode may be switched by operating an icon or the like arranged on the display unit.

The blend ratio in the above-described imaging apparatus may be determined according to the peaking signal and user setting.

The blend ratio may be determined only on the basis of the peaking signal, only on the basis of the user setting, or on the basis of both the peaking signal and the user setting. Furthermore, these switching may be configured to be settable by the user.

The above-described imaging apparatus may further include a notification unit for notifying a user that the display corresponding to the output from the blending processing unit is performed in a case where the display corresponding to the output from the blending processing unit is performed on the display unit.

For example, the notification unit may execute processing of displaying an icon indicating that the image subjected to the blending processing is displayed on the display unit, or may execute the notification processing by providing a light emitting unit such as a notification light emitting diode (LED).

An image processing method according to the present technology is an image processing method performed by an image processing apparatus, the method including: generating a plurality of image signals having frequency characteristics different from each other from one captured image signal; and blending the plurality of image signals on the basis of a blend ratio determined on the basis of a peaking signal.

A program according to the present technology is for causing an information processing apparatus to execute processing of generating a plurality of image signals having frequency characteristics different from each other from one captured image signal; and blending the plurality of image signals on the basis of a blend ratio determined on the basis of a peaking signal.

MODE FOR CARRYING OUT THE INVENTION

Hereinafter, embodiments will be described in the following order with reference to the accompanying drawings.

<1. First Embodiment>
<2. Second Embodiment>
<3. Third Embodiment>
<4. Fourth Embodiment>
<5. Modification>
<6. Summary>
<7. Application example>
<8. Present technology>

1. First Embodiment

Figure 1:
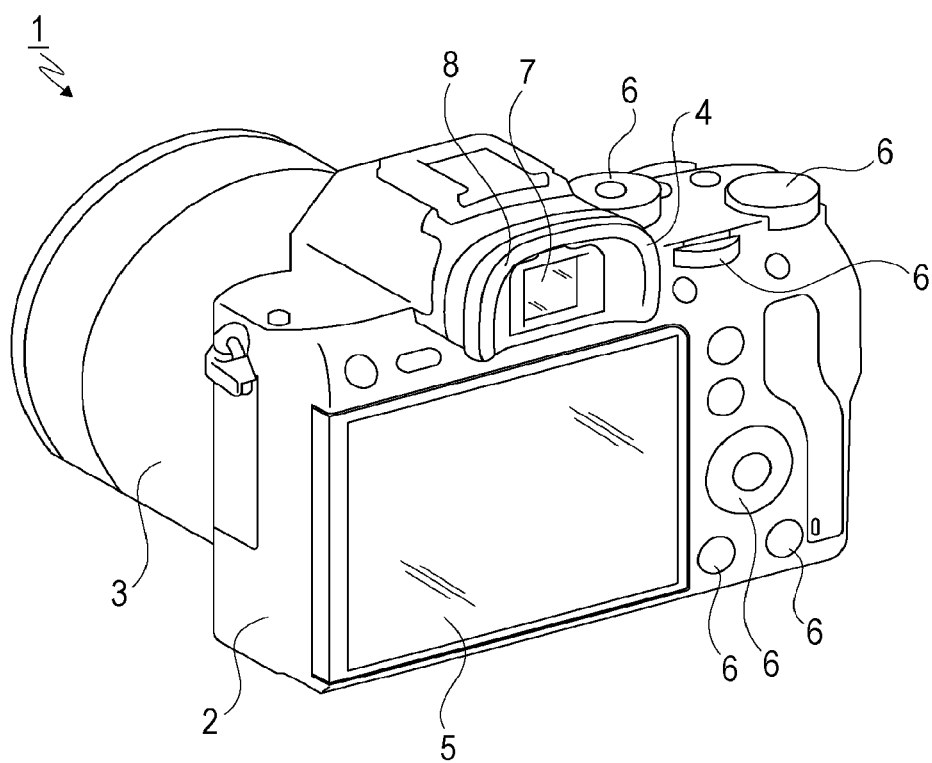
FIG. 1 is a perspective view of an imaging apparatus according to an embodiment of the present technology.

FIG. 1 illustrates an external appearance of imaging apparatus 1 according to the present embodiment.

The imaging apparatus 1 includes a camera housing 2 having an internal space in which a substrate or the like is disposed, and a lens housing 3 attached to the front of the camera housing 2 and in which a lens group is disposed.

An electronic viewfinder (EVF) 4 is provided in an upper portion of the camera housing 2, and a rear monitor 5 is attached to a rear portion of the camera housing 2. In the camera housing 2, various operators 6 for imaging a subject and checking a captured image are provided in each unit. Specific examples of the operator include a playback menu activation button, a determination button, a cross key, a cancel button, a zoom key, a slide key, a shutter button (release button), and the like.

EVF 4 includes EVF monitor 7 that can be visually recognized from the rear, and frame-shaped enclosure 8 that protrudes rearward so as to surround the upper, right, and left sides of EVF monitor 7. That is, the EVF monitor 7 is provided in the finder.

The rear monitor 5 is rotatable with respect to the camera housing 2. For example, the lower end portion of the rear monitor 5 can be rotated so as to move backward with the upper end portion of the rear monitor 5 as a rotation axis.

Note that the right end portion or the left end portion of the rear monitor 5 may be used as a rotation shaft. Moreover, the rear monitor 5 may be rotatable in a plurality of directions.

Figure 2:
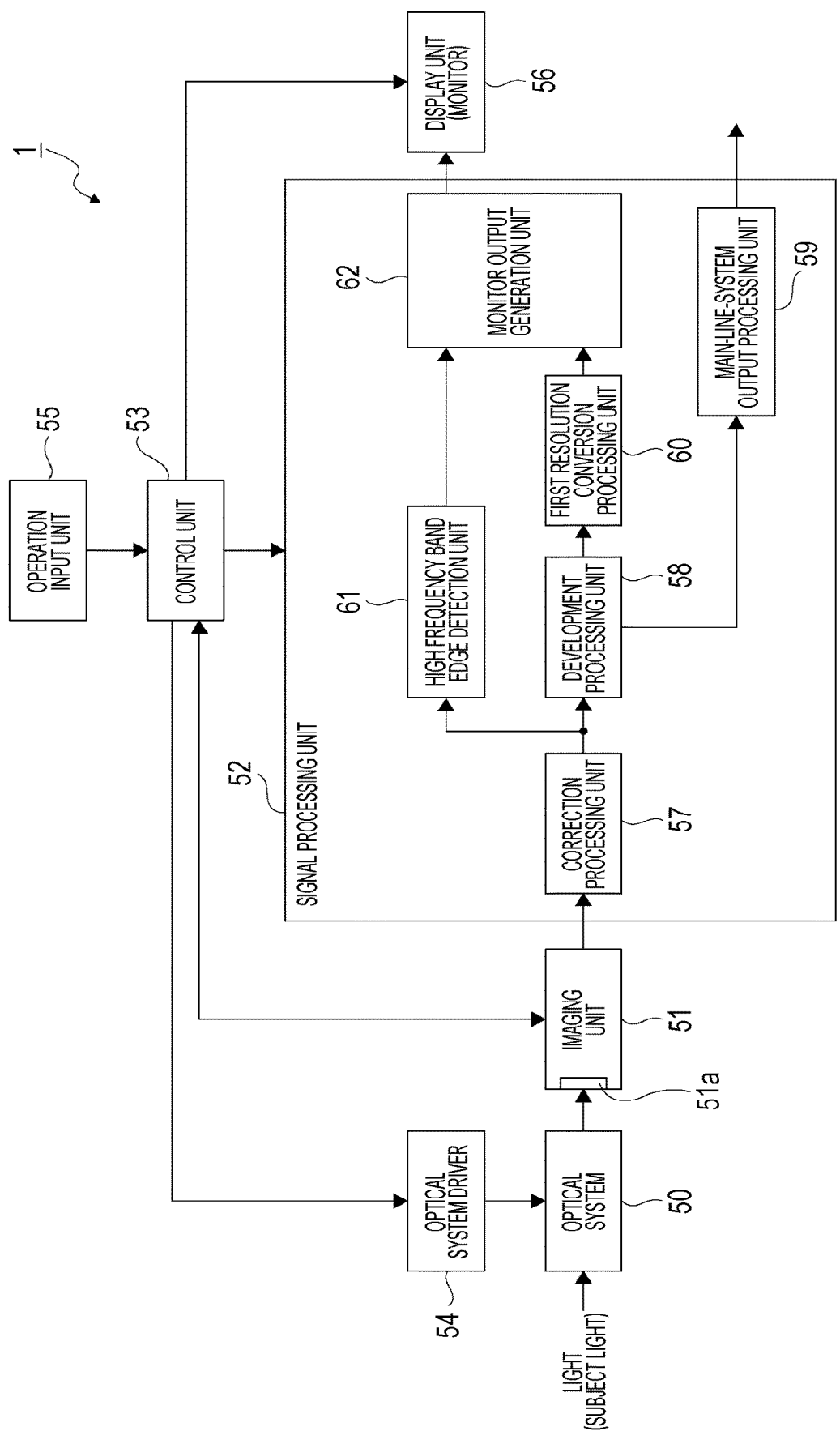
FIG. 2 is a block diagram of an imaging apparatus according to the embodiment.

FIG. 2 is a block diagram of the imaging apparatus 1. The imaging apparatus 1 includes an optical system 50, an imaging unit 51, a signal processing unit 52, a control unit 53, an optical system driver 54, an operation input unit 55, a display unit 56, and the like. The display unit 56 is, for example, the rear monitor 5 or the EVF monitor 7. In the following description, an image is output to the EVF monitor 7 as the display unit 56.

Note that, although not illustrated in FIG. 2, the imaging apparatus 1 may include a memory unit, sensors, a storage unit, a communication unit, and the like.

The optical system 50 includes various lenses such as an incident end lens, a zoom lens, a focus lens, and a condenser lens, a diaphragm mechanism, and the like. The diaphragm mechanism performs exposure control by adjusting an aperture amount or the like by a lens or an iris (diaphragm) such that sensing is performed in a state where signal charges are not saturated and are within a dynamic range. Light (subject light) reflected from the subject enters the optical system 50.

The imaging unit 51 includes, for example, a charge coupled device (CCD) type or complementary metal-oxide semiconductor (CMOS) type imaging element 51a.

The sensor surface of the imaging element 51a includes a sensing element in which a plurality of pixels is two-dimensionally arranged.

The imaging unit 51 performs, for example, correlated double sampling (CDS) processing, automatic gain control (AGC) processing, and the like, and further performs analog/digital (A/D) conversion processing on an electrical signal obtained by photoelectrically converting light received by the imaging element 51a. Then, the captured image data as digital data is output to the signal processing unit 52 in the subsequent stage. Note that, in the following description, an example will be given in which the imaging element 51a has a resolution of a 4K image, and the EVF monitor 7 has a 2K resolution.

The signal processing unit 52 includes, for example, a microprocessor specialized in digital signal processing such as a digital signal processor (DSP), a microcomputer, or the like.

The signal processing unit 52 includes units for performing various types of signal processing on the digital signal (captured image signal) transmitted from the imaging unit 51.

Specifically, the signal processing unit 52 includes a correction processing unit 57, a development processing unit 58, a main-line system output processing unit 59, a first resolution conversion processing unit 60, a high frequency band edge detection unit 61, a monitor output generation unit 62, and the like. Details will be described later with reference to FIG. 3.

By performing the signal processing by these units, the image signal output to the EVF monitor 7 as the display unit and the image signal of the 4K resolution as the main-line output are output from the signal processing unit 52.

The control unit 53 performs overall control of the imaging apparatus 1. Furthermore, the control unit 53 instructs the optical system driver 54 to control various lenses included in the optical system 50.

The optical system driver 54 is provided with, for example, a motor driver for a zoom lens drive motor, a motor driver for a focus lens drive motor, a motor driver for a motor for driving a diaphragm mechanism, and the like.

The control unit 53 can acquire information on various lenses included in the optical system 50. The information of the lens includes, for example, information such as a model number of the lens, a position of the zoom lens, and an f-number (diaphragm value).

The correction processing unit 57 performs, for example, processing such as correction processing between R, G, and B color channels, white balance correction, aberration correction, and shading correction. The image signal output from the correction processing unit 57 is input to the development processing unit 58 and the high frequency band edge detection unit 61.

The development processing unit 58 performs a YC generation process of generating (separating) a luminance (Y) signal and a color (C) signal from R, G, and B image data, a process of adjusting luminance and color, a knee correction, a gamma correction, and the like.

The main-line system output processing unit 59 performs resolution conversion processing, codec processing of performing encoding for recording or communication, or the like, thereby converts the image signal into a final output format, and outputs the converted image signal to the outside as a main-line output of a 4K image or the like.

The first resolution conversion processing unit 60 performs resolution conversion processing (down-conversion processing) on the image signal output from the development processing unit 58, and generates an image signal with 2K resolution from the image signal with 4K resolution. The image signal having the 2K resolution is input to the monitor output generation unit 62.

The high frequency band edge detection unit 61 performs processing of extracting an edge detection signal with 2K resolution from the image signal subjected to various types of correction processing by the correction processing unit 57. Specifically, the high frequency band edge detection unit 61 extracts an edge detection signal in a high frequency band from an image signal having 4K resolution, and performs resolution conversion processing on the edge detection signal to extract an edge detection signal having 2K resolution.

Figure 3:
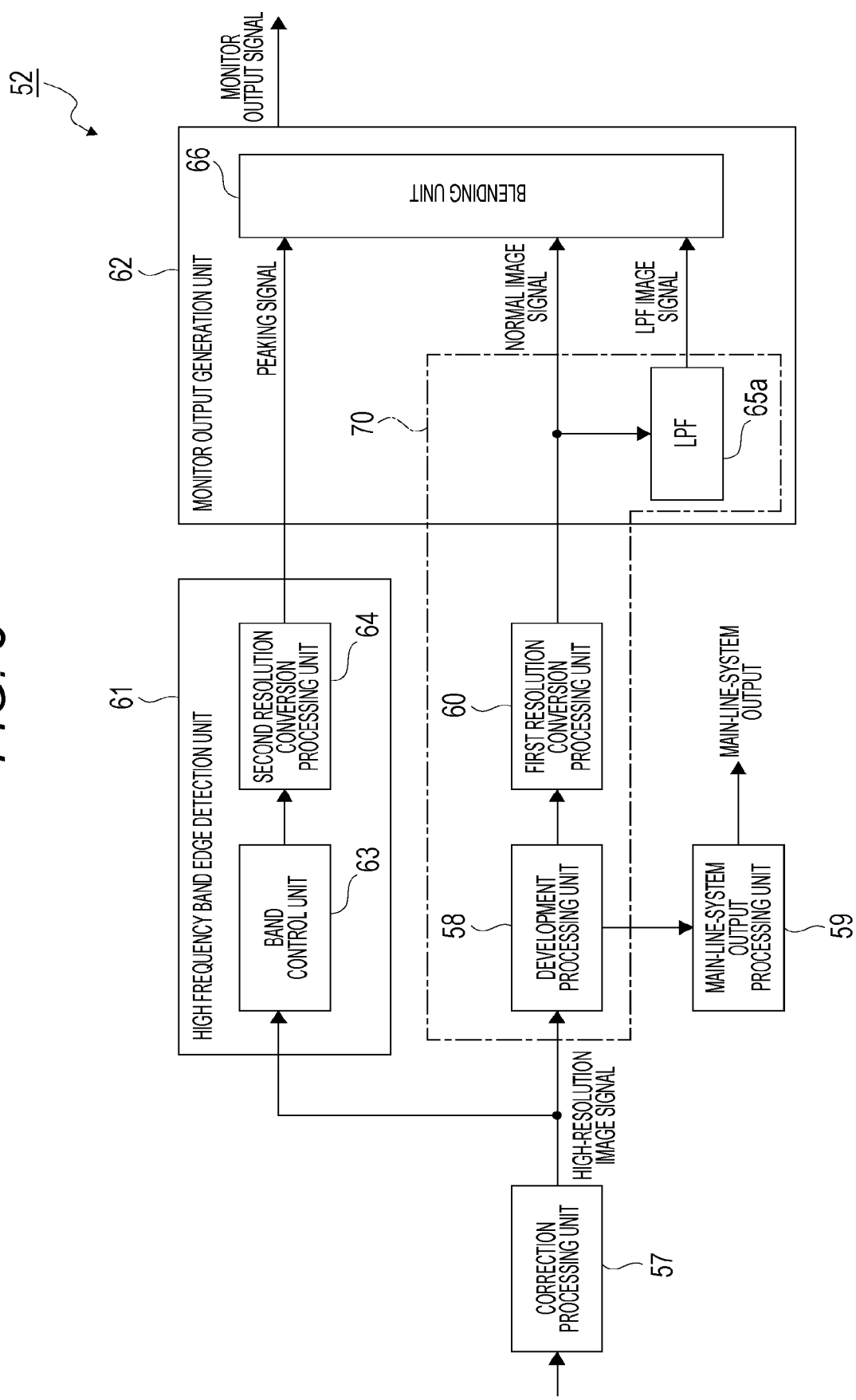
FIG. 3 is a block diagram illustrating an example of a signal processing unit in the first embodiment.

Note that the high frequency band edge detection unit 61 includes a band control unit 63 and a second resolution conversion processing unit 64 (see FIG. 3). That is, the band control unit 63 performs filtering for extracting an edge detection signal, and the second resolution conversion processing unit 64 performs resolution conversion to obtain an edge detection signal with 2K resolution.

Therefore, the control unit 53 controls the band control unit 63 on the basis of the lens information such that band control based on the frequency of the edge detection signal to be extracted is performed. For example, the band control unit 63 is controlled such that the band passing through the band control unit 63 corresponds to the position of the zoom lens.

Specifically, in a case where zoom shooting is performed, the frequency band of the captured image is often lower than that in imaging by equal magnification. Therefore, in a case where imaging is performed at a low magnification, the band control unit 63 is controlled so that a high-frequency component is extracted as the edge detection signal. Conversely, in a case where imaging is performed at a high magnification (in a case where zoom shooting is performed at a high magnification), there is a possibility that a high-frequency component cannot be extracted and an appropriate edge detection signal cannot be obtained. Therefore, the band control unit 63 is controlled such that a slightly lower frequency component is extracted as an edge detection signal.

Furthermore, the control unit 53 performs control so that the band passing through the band control unit 63 becomes appropriate according to the F value. If the F value is too large, it is difficult to extract a high-frequency component as an edge detection signal due to diaphragm blurring. Furthermore, if the F value is too small, similarly, it is difficult to extract a high-frequency component as the edge detection signal due to open blurring.

Moreover, the control unit 53 performs control so that the band passing through the band control unit 63 becomes appropriate according to the type of lens. That is, the band control unit 63 is controlled according to a modulation transfer function (MTF) characteristic for each lens.

The high frequency band edge detection unit 61 extracts an edge detection signal in a high frequency band at 2K resolution from an image signal with 4K resolution. Therefore, the high frequency band edge detection unit 61 performs processing in units of four pixels including two pixels in the horizontal direction and two pixels in the vertical direction. Therefore, the band control unit 63 and the second resolution conversion processing unit 64 included in the high frequency band edge detection unit 61 also perform processing for every four pixels. That is, the band control unit 63 may include a band control unit 63*a* that processes one upper left pixel of four pixels, a band control unit 63*b* that processes one upper right pixel, a band control unit 63*c* that processes one lower left pixel, and a band control unit 63*d* that processes one lower right pixel.

The band control unit 63 extracts an edge detection signal of a predetermined band according to an instruction from the control unit 53. The band control unit 63 performs both a process of detecting an edge in the horizontal direction and a process of detecting an edge in the vertical direction. As the processing of detecting the edge in the horizontal direction and the processing of detecting the edge in the vertical direction, for example, gain stabilization processing using a gain coefficient for stabilizing the gain, processing of removing random noise, and the like are performed.

Furthermore, the band control unit 63 in the present configuration selects and extracts a signal having a large absolute value from among the edge detection signal in the horizontal direction and the edge detection signal in the vertical direction, and outputs the selected signal as an edge detection signal for one pixel to be processed. That is, either the horizontal edge detection signal or the vertical edge detection signal for each pixel is selected and output from the band control unit 63 as the edge detection signal of each of the four pixels.

The second resolution conversion processing unit 64 receives the edge detection signals for four pixels output from the band control unit 63, performs down-conversion processing, and outputs the signals as edge detection signals (peaking signals) for one pixel.

The second resolution conversion processing unit 64 in the present configuration is configured to perform the down-conversion processing without impairing the edge information in the high frequency band.

Specifically, a difference between consecutive edge detection signals is calculated, and a set having the largest difference is output. As a result, the edge detection signal with 2K resolution is generated (extracted) from the edge detection signal with 4K resolution so that the edge information in the high frequency band is not impaired.

Note that the second resolution conversion processing unit 64 may perform not only the down-conversion processing but also the squaring processing to emphasize a signal in a band in a narrower range. Furthermore, by using a selector capable of selecting a signal subjected to the squaring processing and a signal not subjected to the squaring processing, an edge detection signal according to user's preference may be output.

The peaking signal output from the second resolution conversion processing unit 64 and the image signal (hereinafter, described as "normal image signal") output from the first resolution conversion processing unit 60 are both input to the monitor output generation unit 62.

The peaking signal and the normal image signal are both 2K resolution signals according to the resolution of the display unit 56. The monitor output generation unit 62 generates an image signal for displaying an image on the display unit 56 using the two signals.

The monitor output generation unit 62 generates the first image signal and the second image signal from the image signal obtained by branching the normal image signal, and performs processing of blending the first image signal and the second image signal on the basis of the peaking signal.

The first image signal and the second image signal are image signals having different frequency characteristics, and for example, the first image signal is an image signal having relatively more high-frequency components than the second image signal.

The monitor output generation unit 62 includes a band-limiting filter 65 and a blending unit 66.

A plurality of examples of the band-limiting filter 65 can be considered. The example illustrated in FIG. 3 is an example in which a low pass filter (LPF) 65*a* is used as the band-limiting filter 65.

The normal image signal output from the first resolution conversion processing unit 60 is branched into two image signals, one of which is input to the blending unit 66 as a normal image signal, and the other is input to the LPF 65*a*.

In the LPF 65*a*, an image signal (Hereinafter, described as "LPF image signal") from which a band of a set predetermined frequency or more is removed is generated.

Note that the filter coefficient of the LPF 65*a* may be given a predetermined value determined in advance by the control unit 53, or may be given as a variable.

In a case where the filter coefficient is variable, the filter coefficient may be determined by the control unit 53 depending on a photographing environment or the like, or may be determined by the control unit 53 on the basis of an operation of a photographer, a video engineer, or the like.

The blending unit 66 blends the normal image signal and the LPF image signal. As a blending method, for example, a fusion method such as a blending unit is used.

For example, if the components (ratios) of the LPF image signal are set to 0 and blended, a simple normal image is displayed on the display unit 56. Furthermore, if the component (ratio) of the normal image signal is set to 0 and blended, the image from which the high-frequency component has been removed is displayed on the display unit 56.

The blending unit 66 generates a region from which the high-frequency component has been removed and a region in which the high-frequency component remains by changing the blend ratio for each pixel or for each region on the basis of the peaking signal.

Specifically, for a pixel (or region) having a large peaking signal, the ratio of the normal image signal is increased and the ratio of the LPF image signal is reduced. Furthermore, for a pixel (or region) having a small peaking signal, the ratio of the normal image signal is reduced and the ratio of the LPF image signal is increased.

For example, the blend ratio between the normal image signal and the LPF image signal in the pixel (region) having the largest peaking signal and the blend ratio in the pixel (region) having the smallest peaking signal may be determined, and for the other pixels (regions), the blend ratio may linearly change from the pixel (region) having the largest peaking signal toward the pixel (region) having the smallest peaking signal.

Note that a pixel (region) having a large peaking signal is a pixel (region) containing a large number of high-frequency components, and is, for example, a focused pixel (region). Furthermore, a pixel (region) having a small peaking signal is a pixel (region) that does not contain a high-frequency component much, and is, for example, a pixel (region) that is not in focus.

That is, in the monitor output signal output from the blending unit 66, a focused pixel (region) is relatively emphasized.

An example will be described with reference to FIGS. 4, 5, 6, and 7.

Figure 4:
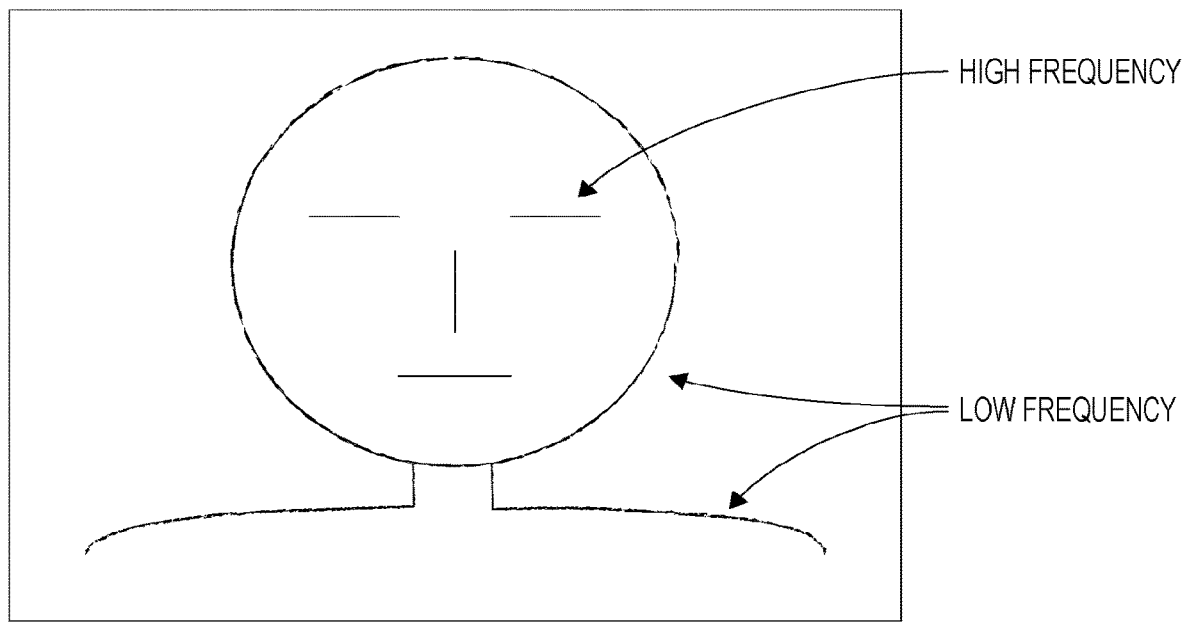
FIG. 4 is an image diagram of a high-resolution image.

FIG. 4 is an image diagram of a high-resolution image such as a 4K image. The eye, nose, and mouth of the person are in focus, and the contour of the face and the shoulder are not in focus. That is, the eye, nose, and mouth portions contain a large amount of high-frequency components, and the contour portion of the face and the shoulder portion contain a small amount of high-frequency components.

Figure 5:
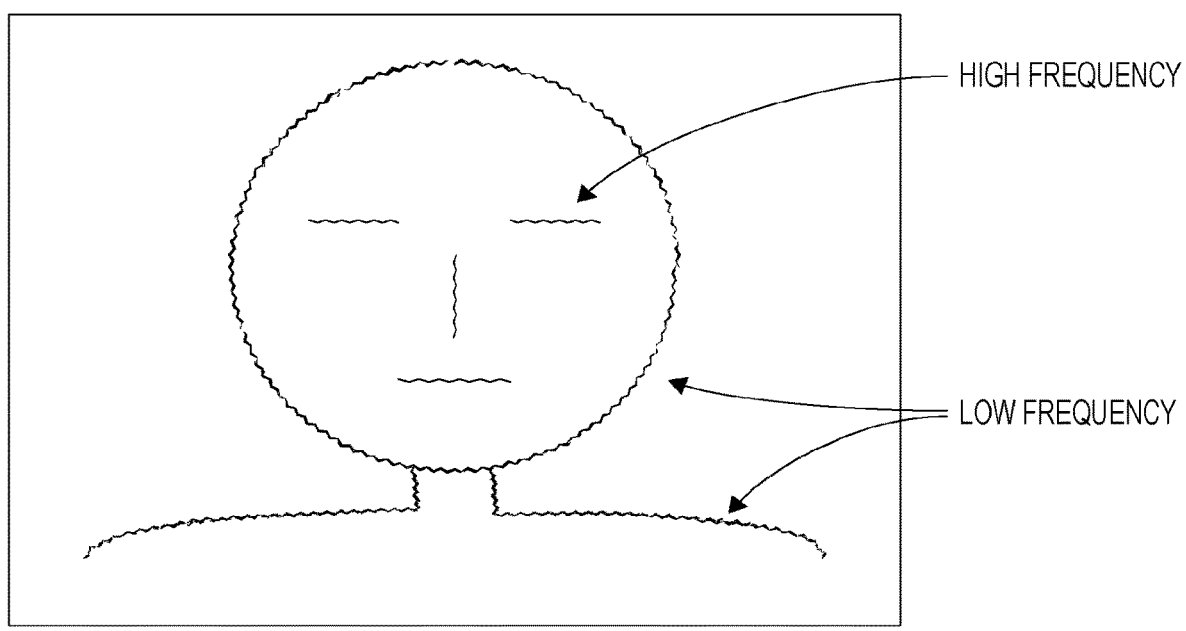
FIG. 5 is an image diagram of a normal image.

FIG. 5 is an image diagram of an image by a normal image signal. That is, the image is subjected to resolution conversion by the first resolution conversion processing unit 60. For the eye, nose, and mouth portions, high-frequency components remain to some extent.

Figure 6:
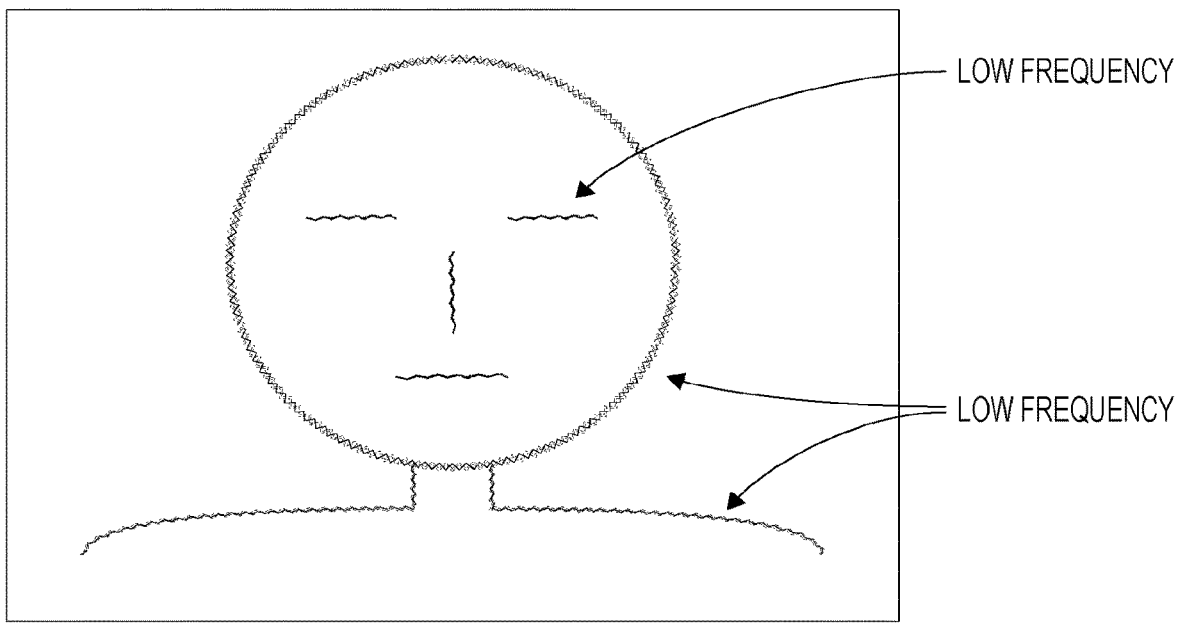
FIG. 6 is an image diagram of an image obtained by removing a high-frequency component from a normal image.

FIG. 6 is an image diagram of an image by a normal image signal via the LPF 65a, that is, an LPF image signal. The high-frequency component is also removed from the eye, nose, and mouth portions. Furthermore, the high-frequency component is further removed from the contour of the face and the shoulder portion.

In the peaking signal extracted by the high frequency band edge detection unit 61 from the high-resolution image illustrated in FIG. 4, the pixel regions of the eyes, the nose, and the mouth are increased, and the pixel regions of the contour portion and the shoulder are reduced.

Figure 7:
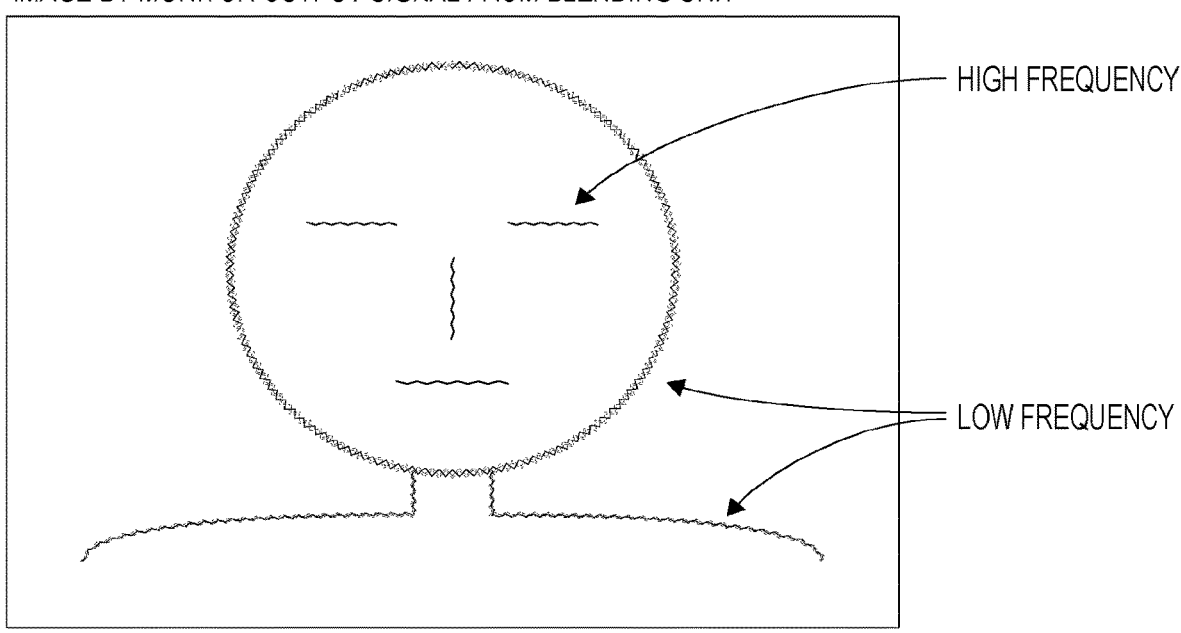
FIG. 7 is an image diagram of a monitor output image output from a blending unit.

Therefore, when the blending unit 66 performs blending based on the peaking signal, the normal image signal illustrated in FIG. 5 is prioritized for the pixel regions for the eyes, the nose, and the mouth, and the LPF image signal illustrated in FIG. 6 is prioritized for the pixel regions for the contour portion and the shoulder. That is, the image displayed on the display unit 56 by the monitor output signal output from the blending unit 66 is as illustrated in FIG. 7.

That is, in the monitor output signal, the pixel region that is not in focus is set as the LPF image signal, and thus, the focused image region is relatively emphasized.

There are several possible blending methods for the blending unit 66.

For example, blending using a distance image may be performed. The distance image refers to an image including a distance pixel signal based on a distance detected by detecting a distance of a subject in a depth direction from the imaging apparatus 1 for each pixel.

A specific description will be given. In a case where the imaging apparatus 1 includes a unit that measures the distance to the subject, the imaging apparatus 1 can generate a distance image.

First, for a pixel region having a high peaking signal, the normal image signal is preferentially blended.

Furthermore, assuming that the distance to the subject in the pixel region having a high peaking signal is D1, then, the distance to the subject in another pixel region can be represented by (D1+d1). d1 is different for each pixel, and as d1 is smaller, a subject is positioned at the same distance as a subject in focus.

In the blending using the distance image, the normal pixel signal is preferentially blended as d1 is smaller, and the LPF image signal is preferentially blended as d1 is larger.

As a result, even in a pixel region in which the peaking signal becomes small due to a small high-frequency component even though the pixel region is in focus, blending is performed with priority given to the normal pixel signal, and it is possible to emphasize that the pixel region is in focus.

As another blending method, blending may be performed according to the pixel distance on the image. Specifically, in the image displayed on the display unit 56, a pixel located closer to a pixel region having a higher peaking signal is blended preferentially with a normal pixel signal, and a pixel located farther from the pixel region is blended preferentially with an LPF image signal.

As a result, it is possible to cause the display unit 56 or the like to display an image in which it is easy to grasp which pixel region is in focus.

2. Second Embodiment

The imaging apparatus 1A according to the second embodiment has a different configuration of the high frequency band edge detection unit and the monitor output generation unit, compared with the first embodiment.

Figure 8:
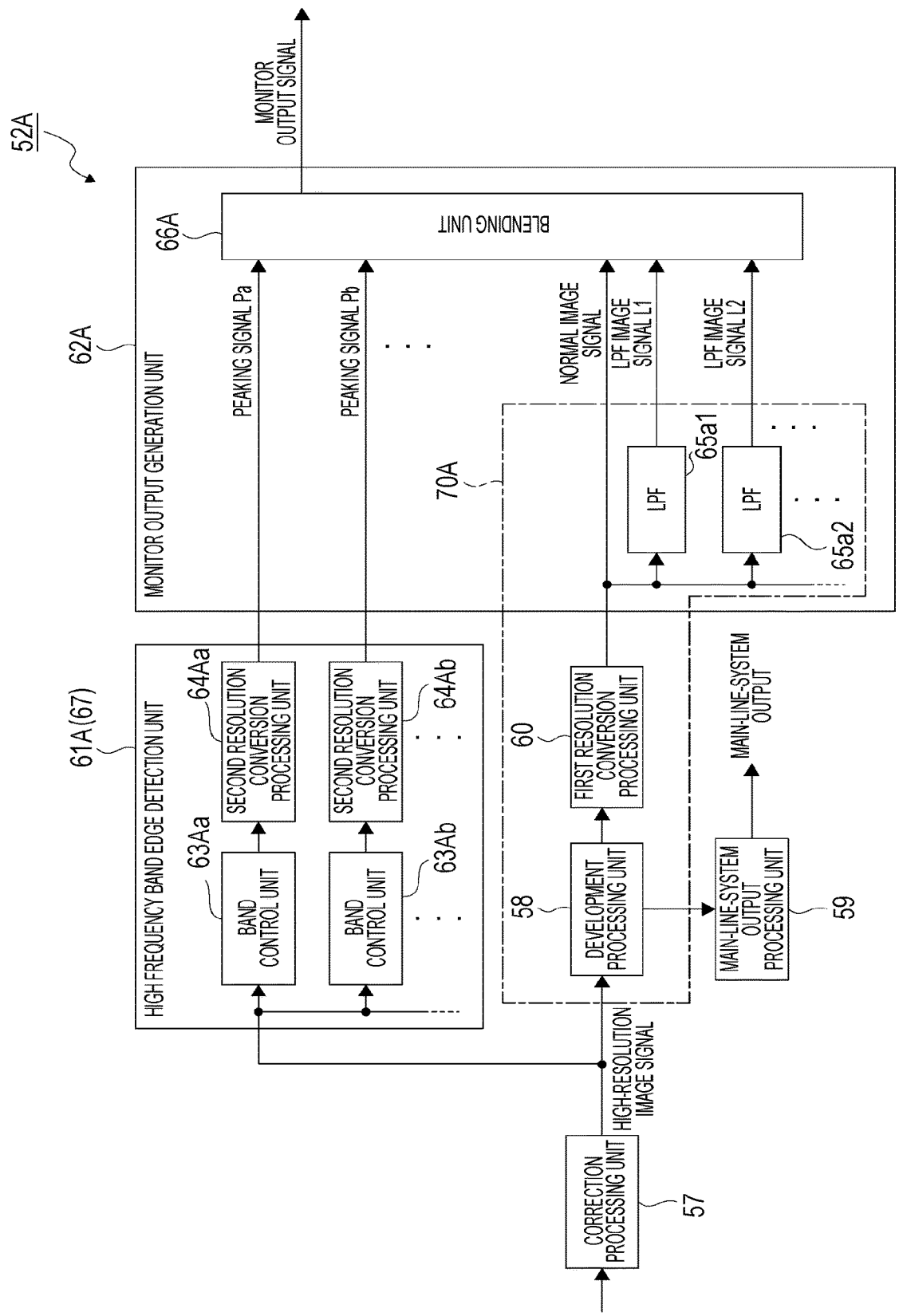
FIG. 8 is a block diagram illustrating an example of a signal processing unit in the second embodiment.

This will be specifically described with reference to FIG. 8.

The imaging apparatus 1A includes a signal processing unit 52A. FIG. 8 is a block diagram of the signal processing unit 52A. The signal processing unit 52A includes a high frequency band edge detection unit 61A and a monitor output generation unit 62A.

The high frequency band edge detection unit 61A includes a plurality of band control units 63Aa, 63Ab, . . . and a plurality of second resolution conversion processing units 64Aa, 64Ab, . . . .

The band control unit 63Aa receives the image signal subjected to various types of correction processing by the correction processing unit 57, and performs filtering processing for extracting an edge detection signal. The output of the band control unit 63Aa is down-converted by the second resolution conversion processing unit 64Aa, and is input to the blending unit 66A of the monitor output generation unit 62A as the peaking signal Pa.

The band control unit 63Ab receives the image signal subjected to various types of correction processing by the correction processing unit 57, and performs filtering processing for extracting an edge detection signal. The output of the band control unit 63Ab is down-converted by the second resolution conversion processing unit 64Ab, and is input to the blending unit 66A of the monitor output generation unit 62A as the peaking signal Pb.

Similarly, the output signal from the correction processing unit 57 is input to the other band control unit 63A, and the extracted edge detection signal is down-converted and input to the blending unit 66A as the peaking signal P.

The plurality of peaking signals Pa, Pb, . . . corresponds to signals obtained by extracting specific components having different frequencies in a high frequency band.

The monitor output generation unit 62A includes a plurality of band-limiting filters 65, 65, . . . and a blending unit 66A.

The plurality of band-limiting filters 65, 65, . . . corresponds to LPFs 65a1, 65a2, . . . .

The LPFs 65a1, 65a2, . . . are LPFs having different pass bands, and output the LPF image signals L1, L2, . . . to the blending unit 66A.

Note that, LPFs 65a1, 65a2, . . . may be band pass filters (BPFs).

The normal image signal as the first image signal not passing through any LPF 65a and the LPF image signals L1, L2, . . . as the second image signal passing through any LPF 65a are input to the blending unit 66A.

The blending unit 66A blends a plurality of image signals (normal image signal, LPF image signal L1, LPF image signal L2, . . . ) on the basis of the plurality of input peaking signals Pa, Pb, . . . . The blending unit 66A may select two image signals from a plurality of image signals and perform a blending, or may select three or more image signals and perform blending.

Furthermore, different a blending may be performed for each pixel region, or three or more image signals may be blended for a specific pixel region.

For example, the blend ratio of the LPF image signal L1 is determined on the basis of the peaking signal Pa. Furthermore, the blend ratio of the LPF image signal L2 is determined on the basis of the peaking signal Pb. Finally, the blend ratio of the normal image signal is determined on the basis of the blend ratio of the LPF image signals L1 and L2. In this way, the blend ratio of the plurality of image signals may be determined.

Moreover, the peaking signal P for determining the blend ratio of the normal image signal may be generated in the high frequency band edge detection unit 61A, and the peaking signal P may be input to the blending unit 66A.

Note that a photographer or a video engineer may be allowed to operate the blend ratio. As a result, it is possible to easily perform adjustment for enabling an image to be captured according to the intention of the photographer or the video engineer.

Furthermore, the specific frequency band component detection unit 67 may be used instead of the high frequency band edge detection unit 61A. That is, the band control units 63Aa, 63Ab, . . . included in the specific frequency band component detection unit 67 extract signals of not only a high frequency band but also a specific frequency band, and the second resolution conversion processing units 64Aa, 64Ab, . . . perform down-conversion so that the signals of the specific frequency band are not lost.

As a result, the blending unit 66A can generate a monitor output signal in which a signal of a specific frequency band is emphasized. That is, it is possible to freely create an image desired by a photographer or a video engineer.

3. Third Embodiment

The imaging apparatus 1B in the third embodiment is an example in which the monitor output generation unit includes a high pass filter (HPF) 65b as the band-limiting filter 65.

Figure 9:
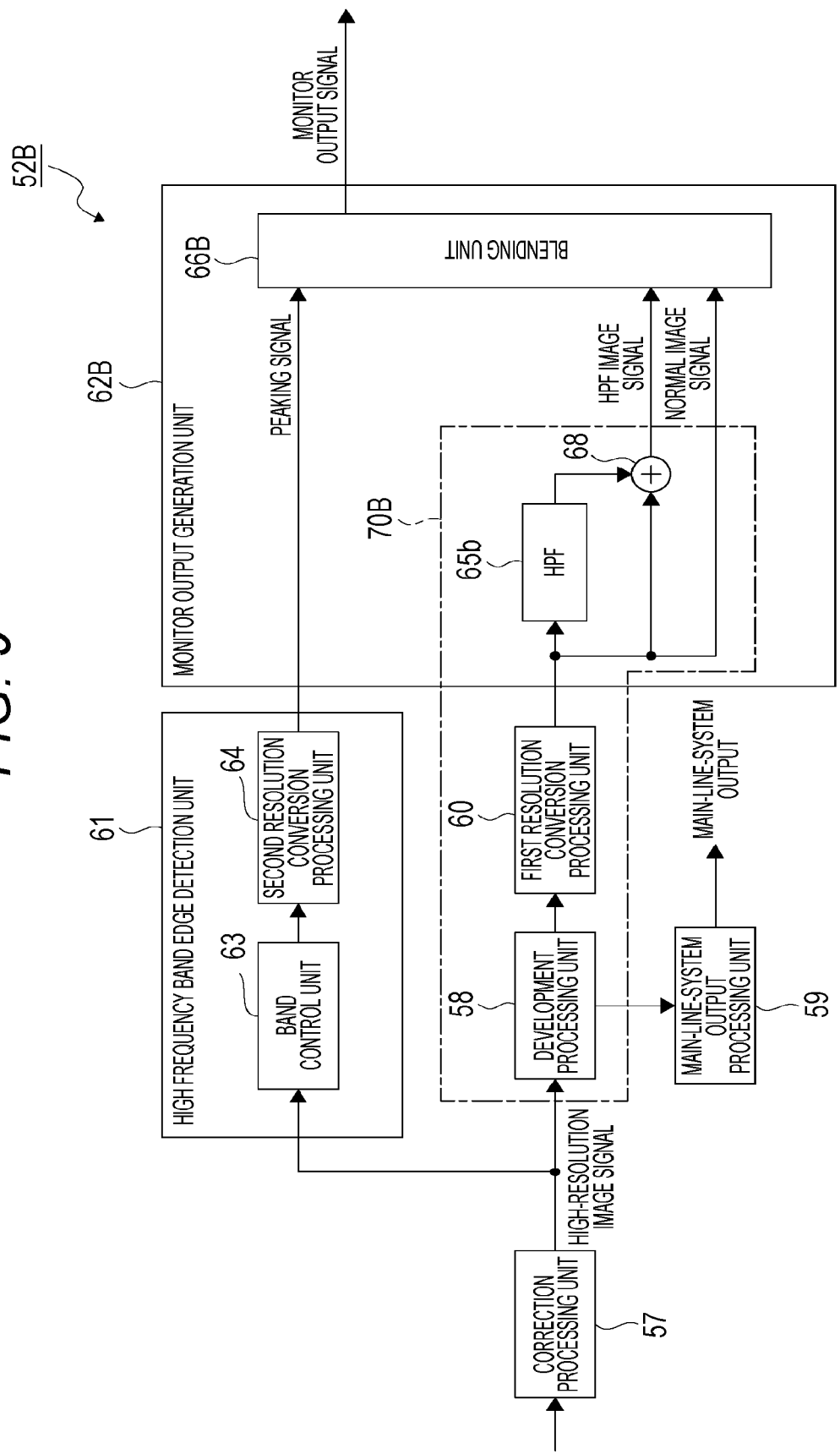
FIG. 9 is a block diagram illustrating an example of a signal processing unit in the third embodiment.

This will be specifically described with reference to FIG. 9.

The imaging apparatus 1B includes a signal processing unit 52B. FIG. 9 is a block diagram of the signal processing unit 52B.

The signal processing unit 52B includes a monitor output generation unit 62B. Monitor output generation unit 62B includes the HPF 65b, an adder 68, and a blending unit 66B.

The peaking signal output from the high frequency band edge detection unit 61 and the normal image signal output from the first resolution conversion processing unit 60 are input to the monitor output generation unit 62B.

The normal image signal input to the monitor output generation unit 62B is branched into three signals, one of which is input to the blending unit 66B as the second image signal while being the normal image signal, one of which is input to the adder 68, and the other one of which is input to the adder 68 via the HPF 65b.

The image signal output from the adder 68 is input to the blending unit 66B as an HPF image signal.

That is, the HPF image signal as the first image signal and the normal image signal as the second image signal are input to the blending unit 66B together with the peaking signal.

Since the HPF image signal is a signal obtained by adding a high-frequency component to the normal image signal, the HPF image signal is a signal in which a high-frequency component is emphasized as compared with the normal image signal.

The blending unit 66B performs blending (for example, a blending) of the HPF image signal and the normal image signal on the basis of the input peaking signal.

Specifically, the HPF image signal is preferentially blended with respect to an image region in focus, and the normal image is preferentially blended with respect to an image region not in focus.

As a result, the focused image area is emphasized and displayed on the display unit 56.

In particular, by setting the HPF image signal to which the high-frequency component is applied as the first image signal, the second image signal is set as the normal image signal, so that the subject can be easily visually recognized even in the pixel region where the peaking signal is small, and the state of the captured image can be easily confirmed on the display unit 56.

4. Fourth Embodiment

In the imaging apparatus 1C in the fourth embodiment, the monitor output generation unit 62C includes a third resolution conversion processing unit 69.

Figure 10:
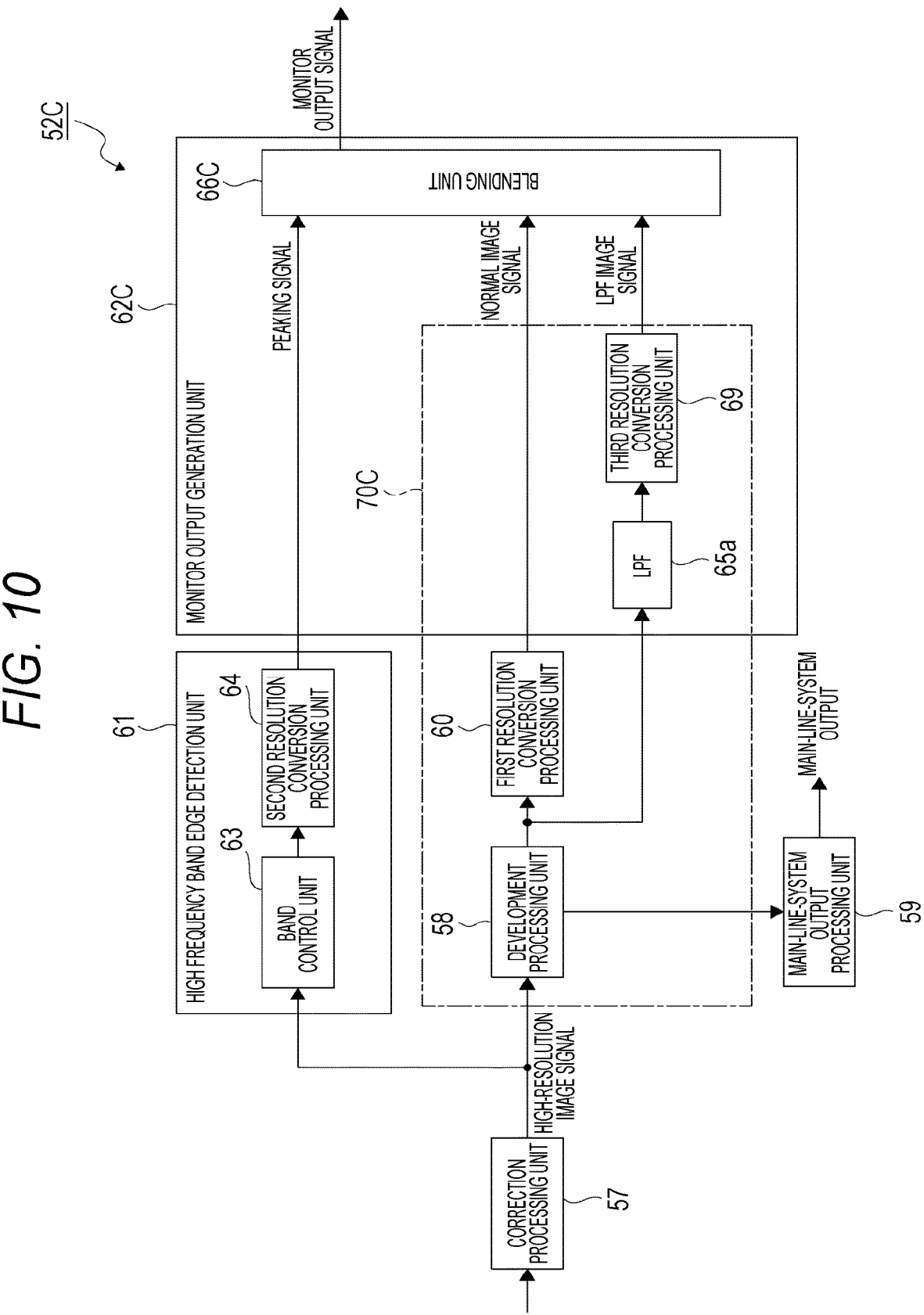
FIG. 10 is a block diagram illustrating an example of a signal processing unit in the fourth embodiment.

This will be specifically described with reference to FIG. 10.

The imaging apparatus 1C includes a signal processing unit 52C. FIG. 10 is a block diagram of the signal processing unit 52C.

The signal stop unit 52C includes a monitor output generation unit 62C. In addition to the peaking signal output from the second resolution conversion processing unit and the normal image signal output from the first resolution conversion processing unit 60, the image signal output from the development processing unit 58 is input to the monitor output generation unit 62C.

The normal image signal output from the first resolution conversion processing unit 60 is input to the blending unit 66C as a first image signal.

The image signal input from the development processing unit 58 to the monitor output generation unit 62C without passing through the first resolution conversion processing unit 60 is left as a high-resolution image signal that has not been down-converted, is input to the LPF 65a serving as the band-limiting filter 65, removes a high-frequency component, and is then input to the third resolution conversion processing unit 69. The third resolution conversion processing unit 69 executes down-conversion processing from the image signal having the 4K resolution to the image signal having the 2K resolution, and generates the LPF image signal input to the blending unit 66C as the second image signal.

The blending unit 66C performs blending processing of the normal image signal as the first image signal and the LPF image signal as the second image signal on the basis of the input peaking signal.

Note that, as described in the third embodiment, the HPF image signal as the first image signal generated using the HPF 65b and the normal image signal as the second image signal may be input to the blending unit 66C.

Note that the imaging apparatus 1 in the first embodiment is a low-resolution image signal obtained by down-converting the input of the LPF 65a as compared with the imaging apparatus 1C in the fourth embodiment, and thus, the processing load of the LPF 65a is reduced, and the processing can be sped up. That is, it is possible to contribute to improvement of the real-time property of the image displayed on the display unit 56.

5. Various Modifications

<5-1. First Modification>

The plurality of image signals described in each example described above may be generated using both the HPF and the LPF.

For example, the first image signal may be an HPF image signal generated using the HPF 65b, and the second image signal may be an LPF image signal generated using the LPF 65a.

The configuration in which the HPF 65b is used to generate the first image signal and the LPF 65a is used to generate the second image signal can be applied not only to the present embodiment but also to the first, second, and third embodiments.

Figure 11:
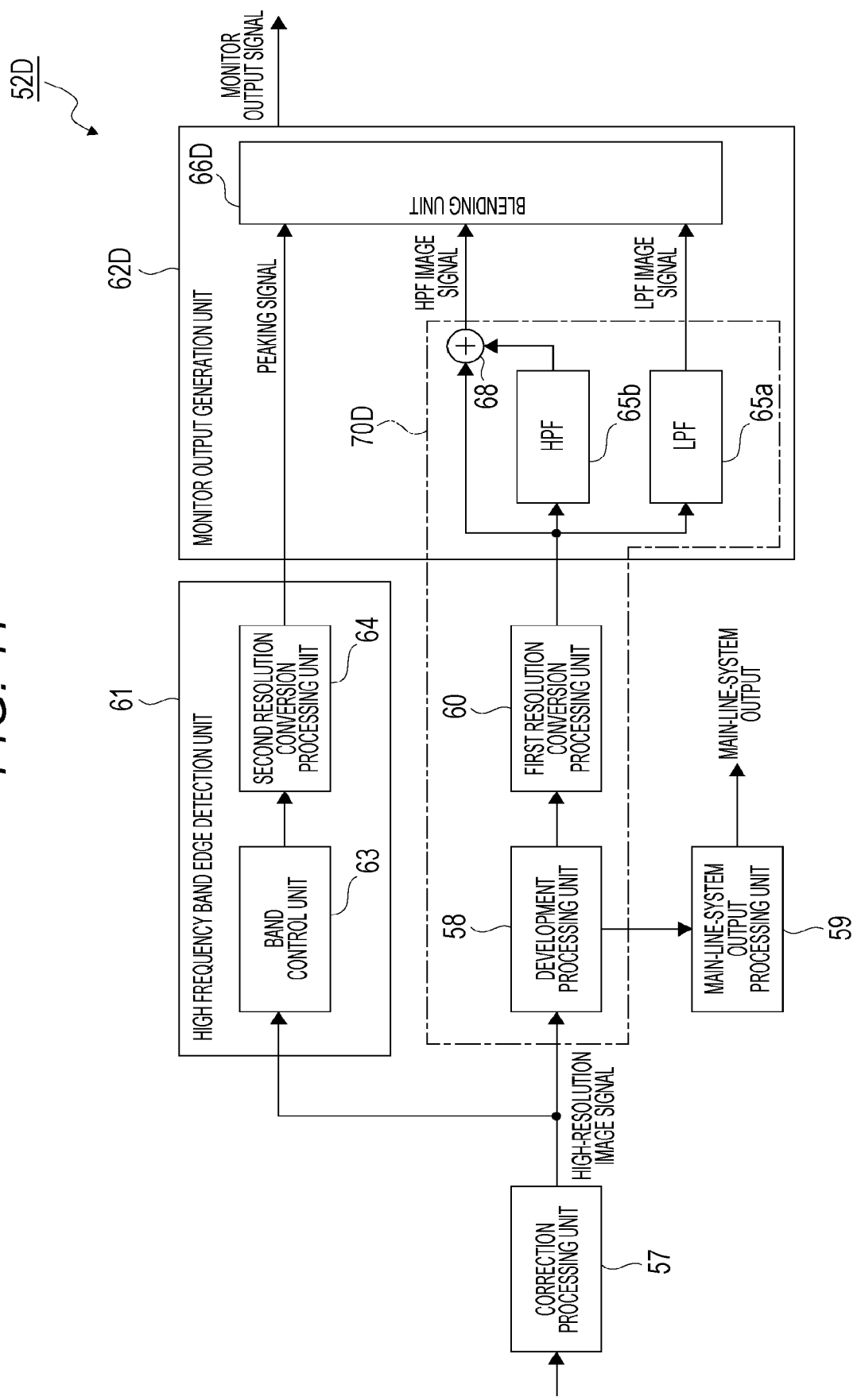
FIG. 11 is a block diagram illustrating an example of a signal processing unit in First modification.

For example, FIG. 11 illustrates the configuration of the First modification applied to the first embodiment. That is, the imaging apparatus 1D includes the monitor output generation unit 62D. The monitor output generation unit 62D includes an HPF 65b and an LPF 65a as the band-limiting filter 65, an adder 68, and a blending unit 66D.

The HPF 65b and the adder 68 generate an HPF image signal as the first image signal, and output the HPF image signal to blending unit 66D.

The LPF 65a generates an LPF image signal as the second image signal and outputs the LPF image signal to the blending unit 66D.

The blending unit 66D performs blending processing of the HPF image signal and the LPF image signal on the basis of the peaking signal.

By blending the HPF image signal and the LPF image signal, the difference between the focused pixel region and the non-focused pixel region can be further clarified, so that the captured image can be easily confirmed.

<5-2. Second Modification>

Second modification has a configuration for enabling selection of which one of a blend image obtained by blending a plurality of image signals by the blending unit 66 and a normal captured image is displayed on the display unit 56.

Figure 12:
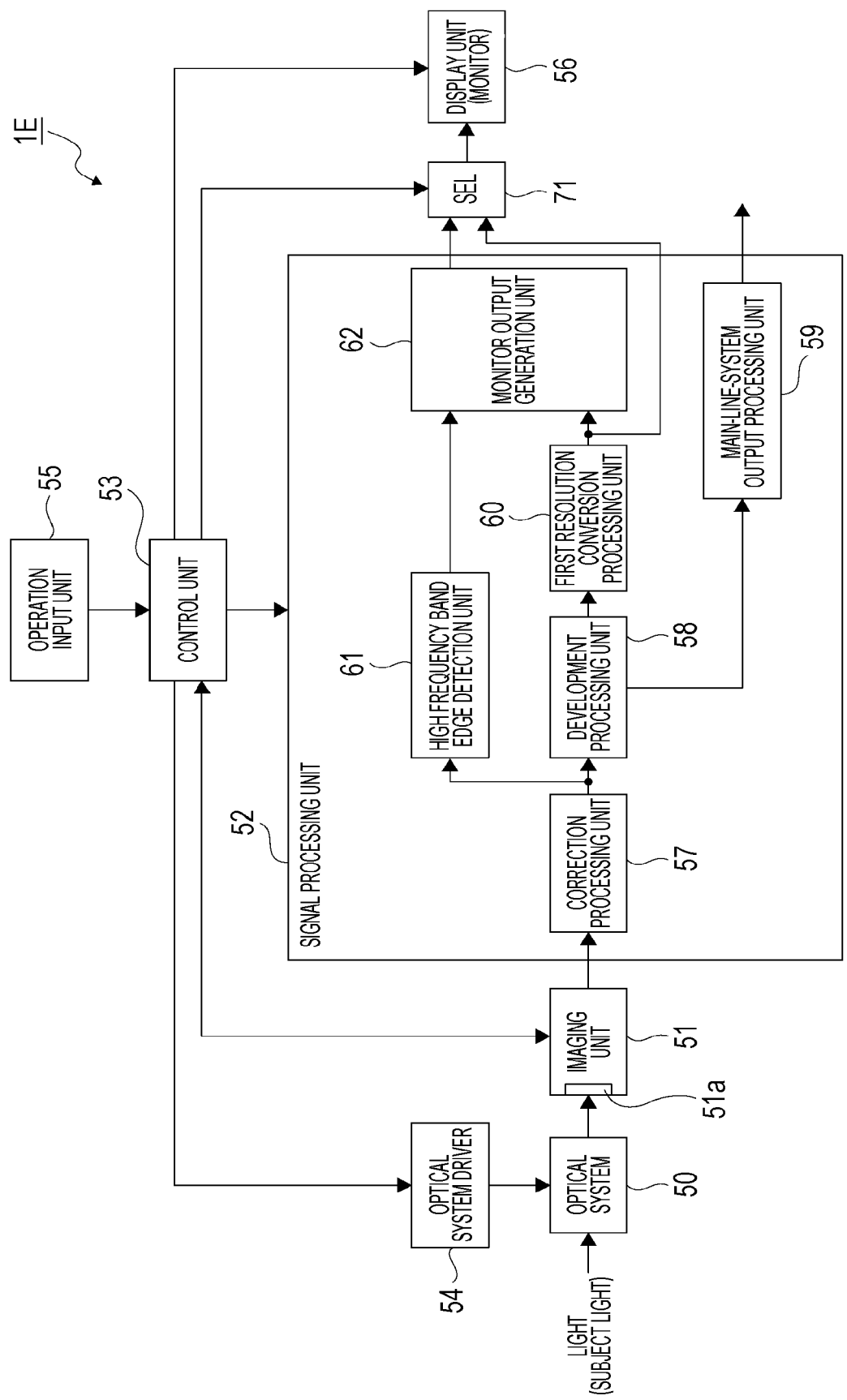
FIG. 12 is a block diagram of an imaging apparatus in Second modification.

This will be specifically described with reference to FIG. 12.

The imaging apparatus 1E includes a selector 71 in addition to the above-described various configurations.

The selector 71 receives the output from the monitor output generation unit 62 (blending unit 66) and the output (image signal) from the first resolution conversion processing unit 60.

The selector 71 outputs, to the display unit 56, any image signal selected on the basis of the control signal from the monitor output generation unit 62 and the first resolution conversion processing unit 60.

A control signal from the control unit 53 is input to the selector 71. The control unit 53 outputs, to the selector 71, a control signal according to the situation or according to the operation by the photographer (or video engineer) using the various operators 6.

With this configuration, for example, the photographer can cause the display unit 56 to display a desired image out of a blend image in which a focused pixel region is emphasized and a normal image.

In the imaging apparatus 1E, the control unit 53 can execute control for providing notification as to which of the blend image and the normal image is displayed on the display unit 56. For example, the display unit 56 functions as a notification unit, and an icon image or the like indicating which one of the blend image and the normal image is displayed is displayed on the screen of the display unit 56 under the control of the control unit 53.

Furthermore, in addition to the display unit 56, a light emitting unit including, for example, a light emitting diode (LED) or the like may be provided as a dedicated notification unit.

6. Summary

As described in each of the examples described above, an image processing apparatus (imaging apparatus 1, LA, 1B, 1C, and 1D) according to the present technology includes: an image signal generation unit that generates a plurality of image signals having frequency characteristics different from each other from one captured image signal (image signal output from the correction processing unit 57); and a blending processing unit (blending unit 66, 66A, 66B, 66C, and 66D) that blends the plurality of image signals on the basis of a blend ratio determined on the basis of a peaking signal for one captured image signal.

Examples of the image signal generation unit include an image signal generation unit 70 (FIG. 3) included in the imaging apparatus 1 according to the first embodiment, an image signal generation unit 70A (FIG. 8) included in the imaging apparatus 1A according to the second embodiment, an image signal generation unit 70B (FIG. 9) included in the imaging apparatus 1B according to the third embodiment, an image signal generation unit 70C (FIG. 10) included in the imaging apparatus 10 according to the fourth embodiment, and an image signal generation unit 70D (FIG. 11) included in the imaging apparatus 1C according to the modification.

The image signals having frequency characteristics different from each other are, for example, an image signal including a high-frequency component and an image signal from which the high-frequency component has been removed.

By generating an image signal by blending an image signal including a high-frequency component and an image signal from which the high-frequency component has been removed, it is possible to generate an image in which the degree of focus (in-focus position) can be easily confirmed. Furthermore, in a case where a display image is generated by blending image signals having different frequency characteristics generated from captured image signals, an image can be made more natural than a display image on which peaking signals are superimposed, and the image can be easily viewed. Furthermore, for example, in the display image on which the peaking signal is superimposed, the superimposed peaking signal is difficult to see, and there is a possibility that it becomes difficult to grasp the degree of focus. According to the present configuration, since all the image signals to be blended are natural images having only different frequency characteristics, it is easy to confirm the degree of focus.

As described in each of the examples described above, the image signal generation unit 70 (70A, 70B, 70C, and 70D) in the image processing apparatus (imaging apparatus 1, 1A, 1B, 1C, and 1D) may include the first resolution conversion processing unit 60 that performs resolution conversion processing of converting an input image signal having the first resolution into an output signal having the second resolution.

The first resolution is, for example, 4K resolution (3840 horizontal pixels and 2160 vertical pixels), and the second resolution is, for example, HD resolution (1280 horizontal pixels and 720 vertical pixels). Alternatively, the first resolution may be 8K resolution (7680 horizontal pixels and 4320 vertical pixels), and the second resolution may be 4K resolution, 2K resolution (1920 horizontal pixels and 1080 vertical pixels), or HD resolution.

By including the first resolution conversion processing unit 60, it is possible to display a low-resolution image for confirming the captured image on the display unit 56.

Note that, in a case where the second resolution is set to be lower than the first resolution, it may be difficult to confirm the degree of focus from the image having the second resolution. Even in such a case, the image signal to be output to the display unit is generated by blending of the plurality of natural images, so that the degree of focus can be easily checked.

As described in each of the above-described examples, the plurality of image signals may include the first image signal and the second image signal, and the first image signal may be an image signal containing more high-frequency components than the second image signal.

One of the image signals is an image including more high-frequency components than the other, and the blend ratio of the image signal is changed for each portion (pixel region) of the display image, whereby the amount of high-frequency components included for each portion of the display image can be changed.

As a result, it is possible to generate a display image in which the focusing degree for each part is expressed. Therefore, the user can easily grasp which part of the image the focus position is located, and the focus adjustment becomes easy.

As described in the first, second, and fourth embodiments, the first image signal in the image processing apparatus (imaging apparatus 1, 1A, and 1C) may be an image signal not via the band-limiting filter 65, and the second image signal may be an image signal via the low pass filter (LPF 65a).

The first image signal is often used for the focus position in the display image. Furthermore, the second image signal is often used for a portion other than the focus position in the display image.

By using the low pass filter, a plurality of image signals having different frequency characteristics can be generated.

As described in the third embodiment, the first image signal in the imaging apparatus 1B as an image processing apparatus may be an image signal via the high pass filter (HPF 65b), and the second image signal may be an image signal not via the band-limiting filter 65.

The first image signal is an image signal in which a high-frequency component is emphasized through a high pass filter.

By using the high pass filter, it is possible to generate a plurality of image signals having different frequency characteristics.

As described in the First modification, the first image signal in the imaging apparatus 1D as the image processing apparatus may be an image signal via the high pass filter (HPF 65b), and the second image signal may be an image signal via the low pass filter (LPF 65a).

The first image signal is an image signal in which a high-frequency component is emphasized by passing through a high pass filter, and the second image signal is an image signal in which a low-frequency component is emphasized by passing through a low pass filter.

As a result, the difference in frequency characteristics between the first image signal and the second image signal increases, and an image signal in which the degree of focus can be more easily checked can be generated.

As described in each example, the imaging apparatus 1 (1A, 1B, 1C, and 1D) as an image processing apparatus may include the high frequency band edge detection unit (61A) that extracts an edge detection signal in a high frequency band as a peaking signal from one captured image signal.

That is, the image processing apparatus includes a high frequency band edge detection unit.

Generation of a peaking signal based on an input of one image signal and blending processing based on the peaking signal are realized in an image processing apparatus. By extracting an edge detection signal in a high frequency band as a peaking signal, it is possible to specify an image position including many high-frequency components. As a result, an image region containing a large amount of high-frequency components and an image region containing a small amount of high-frequency components can be specified, and blending according to the amount of high-frequency components can be performed.

As described in each example, the high frequency band edge detection unit 61 (61A) in the imaging apparatus 1 (1A, 1B, 10, and 1D) as an image processing apparatus may include the second resolution conversion processing unit 64 (64Aa, 64Ab, . . . ) that performs resolution conversion processing in a state where edge information in a high frequency band is maintained.

As a result, the peaking signal used for determining the blend ratio is a signal down-converted without removing the high-frequency component.

That is, since the high-frequency component remains in the signal corresponding to the down-converted low pixel number, the blend ratio can be appropriately determined. As a result, the first image signal having more high-frequency components is blended at the in-focus position of the image than the second image signal, and an image in which the degree of focus can be easily checked can be generated.

As described in each example, the high frequency band edge detection unit 61 (61A) in the imaging apparatus 1 (1A, 1B, 1C, and 1D) as the image processing apparatus may include the band control unit 63 (63Aa, 63Ab, . . . ) that controls the high frequency band on the basis of the lens information regarding the lens used for imaging.

The lens information may be, for example, positional information of the zoom lens, information such as an F value, or a lens model number that can specify the information.

The pass band of the band control unit is controlled on the basis of the lens information so as to correspond to the frequency of the edge detection signal to be extracted by the high frequency band edge detection unit, whereby the gain of the edge detection signal is stabilized.

As described in each example, the blending processing unit (blending unit 66, 66A, 66B, 66C, and 66D) in the imaging apparatus 1 (1A, 1B, 1C, and 1D) as an image processing apparatus may perform α blending on the basis of the blend ratio.

As a result, two image signals having different frequency characteristics are synthesized by the blending processing unit.

That is, it is possible to realize generation of an image in which the degree of focus can be confirmed by synthesis of natural images by the image processing apparatus.

An imaging apparatus 1 (1A, 1B, 1C, and 1D) includes: an imaging element 51a with a first number of pixels; a display unit 56 (an EVF monitor 7 or a rear monitor 5) with a second number of pixels smaller than the first number of pixels; an image signal generation unit 70 (70A, 70B, 70C, and 70D) that generates a plurality of image signals having frequency characteristics different from each other from one captured image signal output from the imaging element 51a; and a blending processing unit (blending unit 66, 66A, 66B, 66C, and 66D) that blends the plurality of image signals on the basis of a blend ratio determined on the basis of a peaking signal and generates an image signal to be output to the display unit 56.

For example, the first number of pixels is the number of pixels based on horizontal 3840 pixels and vertical 2160 pixels that are 4K resolution, and the second number of pixels is the number of pixels based on horizontal 1280 pixels and vertical 720 pixels that are HD resolution.

In a case where a captured image signal captured with a high resolution is displayed on the display unit 56 having a lower resolution than that, it is necessary to down-convert the image signal. Then, in the down-conversion processing, there is a possibility that a high-frequency component is missing. According to this configuration, the image signal is generated by blending the image signal including the relatively high-frequency component and the image signal from which the relatively high-frequency component has been removed, so that it is possible to generate an image in which the degree of focus (in-focus position) can be easily confirmed.

Furthermore, by generating an image signal by combining down-converted natural images, it is easier to grasp the degree of focus than a display image on which a peaking signal is superimposed.

As described in Second modification, the imaging apparatus 1E may include a switching processing unit (control unit 53) that switches between a mode in which the output from the blending processing unit (blending unit 66) is input to the display unit 56 and a mode in which the output from the resolution conversion processing unit (first resolution conversion processing unit 60) is input to the display unit 56 without passing through the blending processing unit.

An operator for switching may be provided corresponding to the switching processing unit. The operator may be, for example, an operator such as a physical button, or an operator for operating the menu screen by being switchable from the menu screen may operate as the switching operator. Furthermore, in a case where the display unit 56 is equipped with a touch panel, the display unit 56 may operate as a switching operator. That is, the mode may be switched by operating an icon or the like arranged on the display unit.

Since it is possible to switch between a mode of displaying an image for confirming the degree of focus and a mode of displaying an image subjected to normal down-conversion processing without performing blending processing, display switching can be performed according to whether or not to confirm the degree of focus. As a result, it is possible to perform image display according to the user's request.

As described in the second embodiment, the blend ratio may be determined according to the peaking signal and the setting of the user (photographer, video engineer, or the like).

The blend ratio may be determined only on the basis of the peaking signal, only on the basis of the user setting, or on the basis of both the peaking signal and the user setting. Furthermore, these switching may be configured to be settable by the user.

The blend ratio is determined according to the user's setting, so that an image by the user's preference can be displayed on the display unit 56. That is, it is possible to perform image display according to the purpose of the user.

As described in the second embodiment, in a case where the display according to the output from the blending processing unit (blending unit 66) is performed on the display unit 56 of the imaging apparatus 1E, a notification unit (the display unit 56 or the light emitting unit) for notifying the user that the display according to the output from the blending processing unit is performed may be provided.

For example, the notification unit may execute processing of displaying an icon indicating that the image subjected to the blending processing is displayed on the display unit 56, or may execute the notification processing by providing a light emitting unit such as a notification light emitting diode (LED).

As a result, it is possible to eliminate the possibility of performing imaging in a state where the image to which the blending processing is applied is displayed on the display unit 56 and in a state where it is not recognized that the image is different from the captured image.

An image processing method according to the present technology is an image processing method performed by an image processing apparatus, the method including: generating a plurality of image signals (for example, a first image signal and a second image signal) having frequency characteristics different from each other from one captured image signal; and blending the plurality of image signals on the basis of a blend ratio determined on the basis of a peaking signal.

A program according to the present technology is a program to be executed by an information processing apparatus (image processing apparatus), and includes processing of generating a plurality of image signals having frequency characteristics different from each other from one captured image signal, and processing of blending the plurality of image signals on the basis of a blend ratio determined on the basis of a peaking signal.

7. Application Example

The technology according to the present disclosure can be applied to various products. For example, the technology according to the present disclosure may be applied to an endoscopic surgery system.

Figure 13:
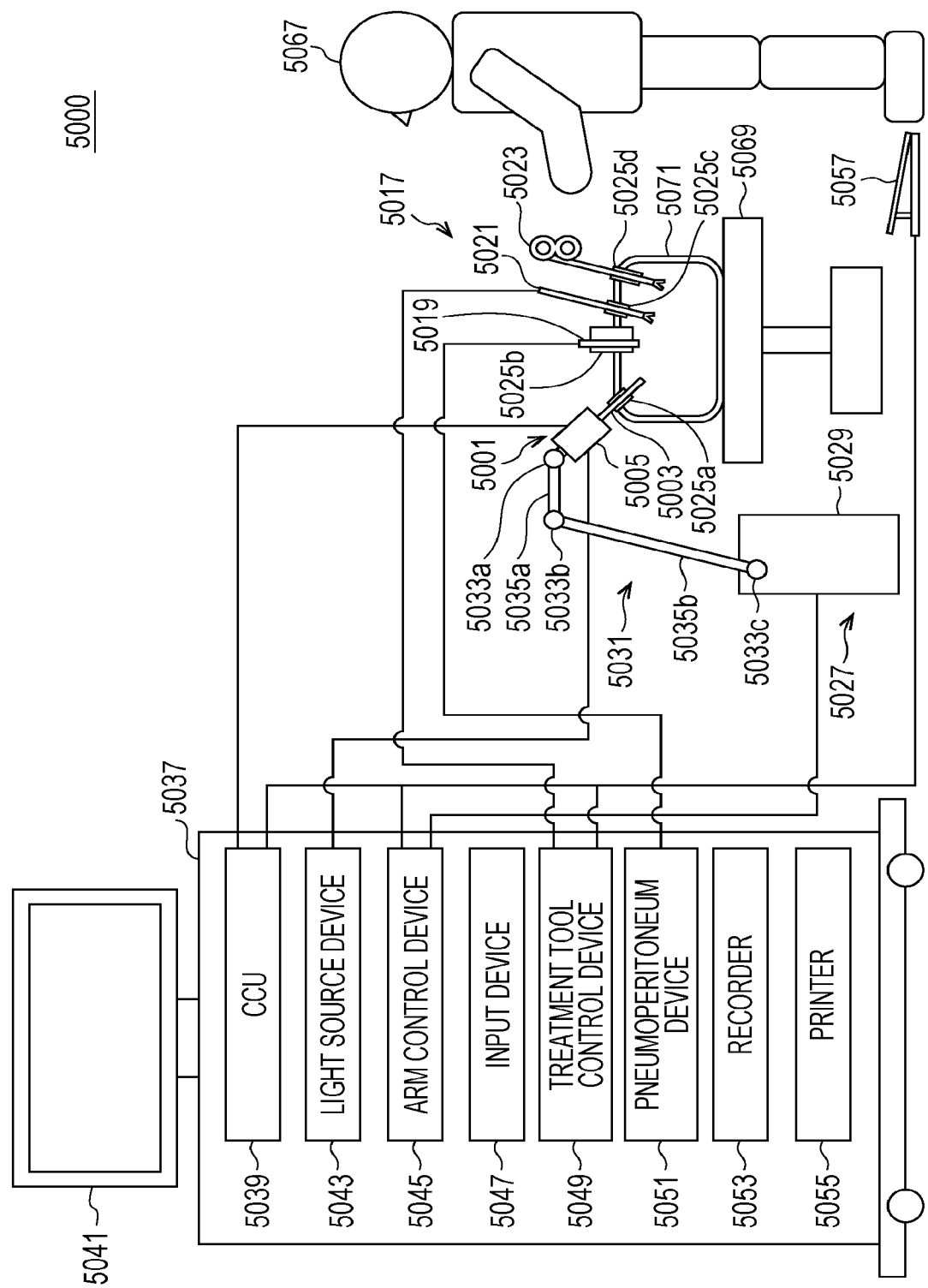
FIG. 13 is a diagram illustrating an example of a schematic configuration of an endoscopic surgery system.

FIG. 13 is a diagram illustrating an example of a schematic configuration of an endoscopic surgery system 5000 to which the technology according to the present disclosure can be applied. FIG. 13 illustrates a state in which a surgeon (doctor) 5067 is performing surgery on a patient 5071 on a patient bed 5069 using an endoscopic surgery system 5000. As illustrated, the endoscopic surgery system 5000 includes an endoscope 5001, other surgical tools 5017, a support arm device 5027 that supports the endoscope 5001, and a cart 5037 on which various devices for endoscopic surgery are mounted.

In endoscopic surgery, instead of cutting and opening the abdominal wall, a plurality of cylindrical puncture instruments called trocars 5025a to 5025d is punctured into the abdominal wall. Then, the lens barrel 5003 of the endoscope 5001 and the other surgical tools 5017 are inserted into the body cavity of the patient 5071 from the trocars 5025a to 5025d. In the illustrated example, as the other surgical tools 5017, a pneumoperitoneum tube 5019, an energy treatment tool 5021, and forceps 5023 are inserted into the body cavity of the patient 5071. Furthermore, the energy treatment tool 5021 is a treatment tool that performs incision and detachment of tissue, sealing of a blood vessel, or the like by high-frequency current or ultrasonic vibration. However, the illustrated surgical tools 5017 are merely an example, and various surgical tools generally used in endoscopic surgery, such as tweezers and a retractor, for example, may be used as the surgical tools 5017.

An image of the surgical site in the body cavity of the patient 5071 captured by the endoscope 5001 is displayed on the display device 5041. While viewing the image of the surgical site displayed on the display device 5041 in real-time, the surgeon 5067 performs treatment such as resection of an affected part using the energy treatment tool 5021 and the forceps 5023. Note that, although not illustrated, the pneumoperitoneum tube 5019, the energy treatment tool 5021, and the forceps 5023 are supported by the surgeon 5067, an assistant, or the like during surgery.

(Support Arm Device)

The support arm device 5027 includes an arm unit 5031 extending from the base portion 5029. In the illustrated example, the arm unit 5031 includes joint portions 5033a, 5033b, and 5033c and links 5035a and 5035b, and is driven under the control of the arm control device 5045. The endoscope 5001 is supported by the arm unit 5031, and its position and posture are controlled. As a result, stable fixation of the position of the endoscope 5001 can be realized.

(Endoscope)

The endoscope 5001 includes a lens barrel 5003 whose region of a predetermined length from the distal end is inserted into the body cavity of the patient 5071, and a camera head 5005 connected to the proximal end of the lens barrel 5003. In the illustrated example, the endoscope 5001 configured as a so-called rigid scope including the rigid lens barrel 5003 is illustrated, but the endoscope 5001 may be configured as a so-called flexible scope including the flexible lens barrel 5003.

An opening portion into which an objective lens is fitted is provided at the distal end of the lens barrel 5003. A light source device 5043 is connected to the endoscope 5001, and light generated by the light source device 5043 is guided to the distal end of the lens barrel by a light guide extending inside the lens barrel 5003, and is emitted toward an observation target in the body cavity of the patient 5071 via the objective lens. Note that the endoscope 5001 may be a forward-viewing endoscope, an oblique-viewing endoscope, or a side-viewing endoscope.

An optical system and an imaging element are provided inside the camera head 5005, and reflected light (observation light) from the observation target is condensed on the imaging element by the optical system. The observation light is photoelectrically converted by the imaging element, and an electric signal corresponding to the observation light, that is, an image signal corresponding to the observation image is generated. The image signal is transmitted to a camera control unit (CCU) 5039 as RAW data. Note that the camera head 5005 is equipped with a function of adjusting the magnification and the focal length by appropriately driving the optical system.

Note that, for example, in order to cope with stereoscopic viewing (3D display) or the like, a plurality of imaging elements may be provided in the camera head 5005. In this case, a plurality of relay optical systems is provided inside the lens barrel 5003 in order to guide the observation light to each of the plurality of imaging elements.

(Various Devices Mounted on Cart)

The CCU 5039 includes a central processing unit (CPU), a graphics processing unit (GPU), and the like, and integrally controls operation of the endoscope 5001 and the display device 5041. Specifically, the CCU 5039 performs, on the image signal received from the camera head 5005, various types of image processing for displaying an image based on the image signal, such as development processing (demosaic processing), for example. The CCU 5039 provides the image signal subjected to the image processing to the display device 5041. Furthermore, the CCU 5039 transmits a control signal to the camera head 5005 and controls driving thereof. The control signal can include information regarding imaging conditions such as magnification and focal length.

The display device 5041 displays an image based on the image signal subjected to the image processing by the CCU 5039 under the control of the CCU 5039. In a case where the endoscope 5001 is compatible with high-resolution imaging such as 4K (the number of horizontal pixels 3840×the number of vertical pixels 2160) or 8K (the number of horizontal pixels 7680× the number of vertical pixels 4320), and/or in a case where the endoscope 5001 is compatible with 3D display, for example, a display device capable of high-resolution display and/or a display device capable of 3D display can be used as the display device 5041 corresponding to each case. In a case where the display device is compatible with high resolution imaging such as 4K or 8K, a further immersive feeling can be obtained by using a display device having a size of 55 inches or more as the display device 5041. Furthermore, a plurality of display devices 5041 having different resolutions and sizes may be provided depending on the application.

The light source device 5043 includes a light source such as a light emitting diode (LED), for example, and supplies irradiation light for imaging a surgical site to the endoscope 5001.

The arm control device 5045 includes, for example, a processor such as a CPU, and operates according to a predetermined program to control driving of the arm unit 5031 of the support arm device 5027 according to a predetermined control method.

The input device 5047 is an input interface for the endoscopic surgery system 5000. The user can input various types of information and instructions to the endoscopic surgery system 5000 via the input device 5047. For example, the user inputs various types of information regarding surgery, such as physical information of a patient and information regarding a surgical procedure of the surgery, via the input device 5047. Furthermore, for example, the user inputs an instruction to drive the arm unit 5031, an instruction to change imaging conditions (type of irradiation light, magnification, focal length, and the like) by the endoscope 5001, an instruction to drive the energy treatment tool 5021, and the like via the input device 5047.

The type of the input device 5047 is not limited, and the input device 5047 may be various known input devices. As the input device 5047, for example, a mouse, a keyboard, a touch panel, a switch, a foot switch 5057, a lever, and/or the like can be applied. In a case where a touch panel is used as the input device 5047, the touch panel may be provided on the display surface of the display device 5041.

Alternatively, the input device 5047 is a device worn by the user, for example, a glasses-type wearable device, a head mounted display (HMD), or the like, and various inputs are performed according to a gesture or a line-of-sight of the user detected by these devices. Furthermore, the input device 5047 includes a camera capable of detecting movement of the user, and various inputs are performed according to a gesture or a line-of-sight of the user detected from a video captured by the camera. Moreover, the input device 5047 includes a microphone capable of collecting user's voice, and various inputs are performed by voice via the microphone. As described above, the input device 5047 is configured to be able to input various types of information in a non-contact manner, and thus, in particular, a user (for example, the surgeon 5067) belonging to a clean area can operate a device belonging to an unclean area in a non-contact manner. Furthermore, since the user can operate the device without releasing his/her hand from the possessed surgical tool, the convenience of the user is improved.

A treatment tool control device 5049 controls driving of the energy treatment tool 5021 for cauterization and incision of tissue, sealing of a blood vessel, or the like. A pneumoperitoneum device 5051 feeds gas into the body cavity of the patient 5071 via the pneumoperitoneum tube 5019 in order to inflate the body cavity for the purpose of securing a visual field by the endoscope 5001 and securing a working space of the surgeon. A recorder 5053 is a device capable of recording various types of information regarding surgery. The printer 5055 is a device capable of printing various types of information regarding surgery in various formats such as text, image, or graph.

Hereinafter, a particularly characteristic configuration of the endoscopic surgery system 5000 will be described in more detail.

(Support Arm Device)

The support arm device 5027 includes a base portion 5029 which is a base, and an arm unit 5031 extending from the base portion 5029. In the illustrated example, the arm unit 5031 includes the plurality of joint portions 5033*a*, 5033*b*, and 5033*c* and the plurality of links 5035*a* and 5035*b* connected by the joint portion 5033*b*, but in FIG. 13, the configuration of the arm unit 5031 is illustrated in a simplified manner for the sake of simplicity. Actually, the shapes, the number, and the arrangement of the joint portions 5033*a* to 5033*c* and the links 5035*a* and 5035*b*, the directions of the rotation axes of the joint portions 5033*a* to 5033*c*, and the like can be appropriately set so that the arm unit 5031 has a desired degree of freedom. For example, the arm unit 5031 can be suitably configured to have 6 degrees of freedom or more. As a result, since the endoscope 5001 can be freely moved within the movable range of the arm unit 5031, the lens barrel 5003 of the endoscope 5001 can be inserted into the body cavity of the patient 5071 from a desired direction.

Actuators are provided in the joint portions 5033*a* to 5033*c*, and the joint portions 5033*a* to 5033*c* are configured to be rotatable around a predetermined rotation axis by driving the actuators. The driving of the actuator is controlled by the arm control device 5045, whereby the rotation angle of each of the joint portions 5033*a* to 5033*c* is controlled, and the driving of the arm unit 5031 is controlled. As a result, control of the position and posture of the endoscope 5001 can be realized. At this time, the arm control device 5045 can control the driving of the arm unit 5031 by various known control methods such as force control or position control.

For example, by the surgeon 5067 appropriately performing an operation input via the input device 5047 (including the foot switch 5057), the driving of the arm unit 5031 may be appropriately controlled by the arm control device 5045 according to the operation input, and the position and posture of the endoscope 5001 may be controlled. With this control, the endoscope 5001 at the distal end of the arm unit 5031 can be moved from an arbitrary position to an arbitrary position and then fixedly supported at the position after the movement. Note that the arm unit 5031 may be operated by a so-called master-slave method. In this case, the arm unit 5031 can be remotely operated by the user via the input device 5047 installed at a place away from the operating room.

Furthermore, in a case where the force control is applied, the arm control device 5045 may perform so-called power assist control of receiving an external force from the user and driving the actuator of each of the joint portions 5033*a* to 5033*c* so that the arm unit 5031 smoothly moves according to the external force. As a result, when the user moves the arm unit 5031 while directly touching the arm unit 5031, the arm unit 5031 can be moved with a relatively light force. Therefore, it is possible to more intuitively move the endoscope 5001 with a simpler operation, and the convenience of the user can be improved.

Here, in general, in endoscopic surgery, the endoscope 5001 is supported by a doctor called scopist. On the other hand, by using the support arm device 5027, it is possible to more reliably fix the position of the endoscope 5001 without manual operation, so that it is possible to stably obtain an image of the surgical site and smoothly perform the surgery.

Note that the arm control device 5045 is not necessarily provided in the cart 5037. Furthermore, the arm control device 5045 is not necessarily one device. For example, the arm control device 5045 may be provided in each of the joint portions 5033a to 5033c of the arm unit 5031 of the support arm device 5027, and the drive control of the arm unit 5031 may be realized by the plurality of arm control devices 5045 cooperating with each other.

(Light Source Device)

The light source device 5043 supplies the endoscope 5001 with irradiation light for imaging the surgical site. The light source device 5043 includes, for example, an LED, a laser light source, or a white light source including a combination thereof. At this time, in a case where the white light source is configured by a combination of RGB laser light sources, the output intensity and the output timing of each color (each wavelength) can be controlled with high accuracy, so that the white balance of the captured image can be adjusted in the light source device 5043. Furthermore, in this case, by irradiating the observation target with the laser light from each of the RGB laser light sources in a time division manner and controlling the driving of the imaging element of the camera head 5005 in synchronization with the irradiation timing, it is also possible to capture an image corresponding to each of RGB in a time division manner. According to this method, a color image can be obtained without providing a color filter in the imaging element.

Furthermore, the driving of the light source device 5043 may be controlled so as to change the intensity of light to be output every predetermined time. By controlling the driving of the imaging element of the camera head 5005 in synchronization with the timing of the change of the intensity of the light to acquire images in a time division manner and synthesizing the images, it is possible to generate an image of a high dynamic range without so-called blocked up shadows and blown out highlights.

Furthermore, the light source device 5043 may be configured to be able to supply light in a predetermined wavelength band corresponding to special light observation. In the special light observation, for example, so-called narrow band imaging is performed in which a predetermined tissue such as a blood vessel in a mucosal surface layer is imaged with high contrast by emitting light in a narrower band than irradiation light (that is, white light) at the time of normal observation using wavelength dependency of light absorption in a body tissue. Alternatively, in the special light observation, fluorescence observation for obtaining an image by fluorescence generated by irradiation with excitation light may be performed. In the fluorescence observation, for example, fluorescence from a body tissue can be observed by irradiating the body tissue with excitation light (autofluorescence observation), or a fluorescent image can be obtained by locally injecting a reagent such as indocyanine green (ICG) into a body tissue and irradiating the body tissue with excitation light corresponding to a fluorescence wavelength of the reagent. The light source device 5043 can be configured to be able to supply narrow band light and/or excitation light corresponding to such special light observation.

(Camera Head and CCU)

Figure 14:
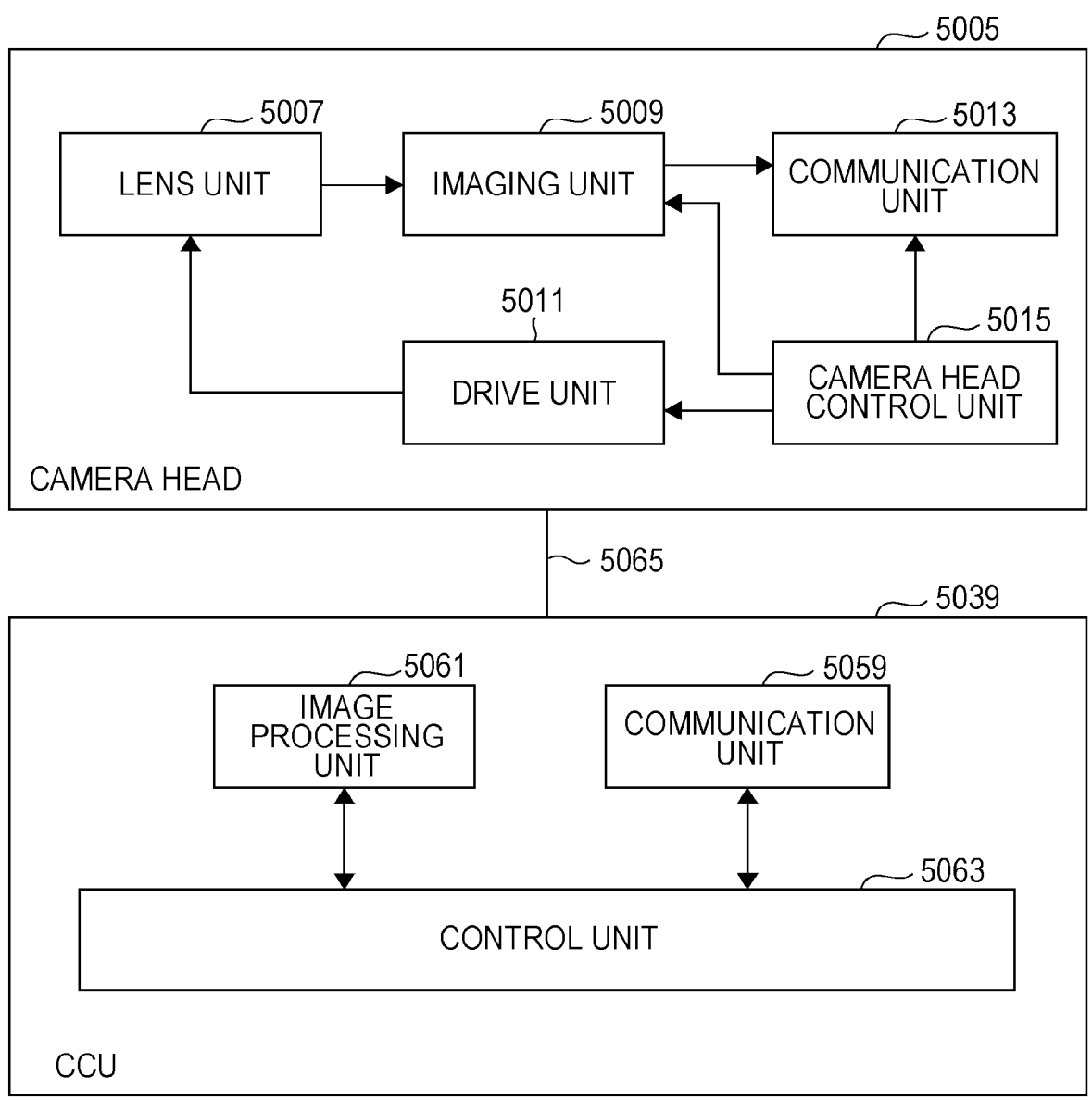
FIG. 14 is a block diagram illustrating an example of functional configurations of a camera head and a CCU illustrated in FIG. 13.

The functions of the camera head 5005 and the CCU 5039 of the endoscope 5001 will be described in more detail with reference to FIG. 14. FIG. 14 is a block diagram illustrating an example of functional configurations of the camera head 5005 and the CCU 5039 illustrated in FIG. 13.

Referring to FIG. 14, the camera head 5005 includes a lens unit 5007, an imaging unit 5009, a drive unit 5011, a communication unit 5013, and a camera head control unit 5015 as functions thereof. Furthermore, the CCU 5039 includes a communication unit 5059, an image processing unit 5061, and a control unit 5063 as its functions. The camera head 5005 and the CCU 5039 are connected by a transmission cable 5065 so as to be bidirectionally communicable.

First, a functional configuration of the camera head 5005 will be described. The lens unit 5007 is an optical system provided at a connection portion with the lens barrel 5003. Observation light taken in from the distal end of the lens barrel 5003 is guided to the camera head 5005 and enters the lens unit 5007. The lens unit 5007 is configured by combining a plurality of lenses including a zoom lens and a focus lens. The optical characteristics of the lens unit 5007 are adjusted so as to condense the observation light on the light receiving surface of the imaging element of the imaging unit 5009. Furthermore, the zoom lens and the focus lens are configured to be movable in position on the optical axis in order to adjust the magnification and the focal point of the captured image.

The imaging unit 5009 includes an imaging element and is arranged at a subsequent stage of the lens unit 5007. The observation light having passed through the lens unit 5007 is condensed on the light receiving surface of the imaging element, and an image signal corresponding to the observation image is generated by photoelectric conversion. The image signal generated by the imaging unit 5009 is provided to the communication unit 5013.

As the imaging element constituting the imaging unit 5009, for example, a complementary metal oxide semiconductor (CMOS) type image sensor having a Bayer array and capable of color capturing is used. Note that, as the imaging element, for example, an imaging element that can cope with capturing of a high-resolution image of 4K or more may be used. By obtaining the image of the surgical site with high resolution, the surgeon 5067 can grasp the state of the surgical site in more detail, and can progress the surgery more smoothly.

Furthermore, the imaging element constituting the imaging unit 5009 is configured to include a pair of imaging elements for acquiring image signals for the right eye and the left eye corresponding to 3D display. By performing the 3D display, the surgeon 5067 can more accurately grasp the depth of the living tissue in the surgical site. Note that, in a case where the imaging unit 5009 is configured as a multi-plate type, a plurality of lens units 5007 is provided corresponding to each imaging element.

Furthermore, the imaging unit 5009 is not necessarily provided in the camera head 5005. For example, the imaging unit 5009 may be provided inside the lens barrel 5003, close behind the objective lens.

The drive unit 5011 includes an actuator, and moves the zoom lens and the focus lens of the lens unit 5007 by a predetermined distance along the optical axis under the control of the camera head control unit 5015. As a result, the magnification and focus of the image captured by the imaging unit 5009 can be appropriately adjusted.

The communication unit 5013 includes a communication device for transmitting and receiving various types of information to and from the CCU 5039. The communication unit 5013 transmits the image signal obtained from the imaging unit 5009 as RAW data to the CCU 5039 via the transmission cable 5065. At this time, in order to display the captured image of the surgical site with low latency, the image signal is preferably transmitted by optical communication. This is because, at the time of surgery, the surgeon 5067 performs surgery while observing the state of the affected part with the captured image, and thus, for safer and more reliable surgery, it is required to display a moving image of the surgical site in real-time as much as possible. In a case where optical communication is performed, the communication unit 5013 is provided with a photoelectric conversion module that converts an electric signal into an optical signal. The image signal is converted into an optical signal by the photoelectric conversion module and then transmitted to the CCU 5039 via the transmission cable 5065.

Furthermore, the communication unit 5013 receives a control signal for controlling driving of the camera head 5005 from the CCU 5039. The control signal includes, for example, information regarding imaging conditions such as information for specifying a frame rate of a captured image, information for specifying an exposure value at the time of imaging, and/or information for specifying a magnification and a focus of a captured image. The communication unit 5013 provides the received control signal to the camera head control unit 5015. Note that the control signal from the CCU 5039 may also be transmitted by optical communication. In this case, the communication unit 5013 is provided with a photoelectric conversion module that converts an optical signal into an electric signal, and the control signal is converted into an electric signal by the photoelectric conversion module and then provided to the camera head control unit 5015.

Note that the imaging conditions such as the frame rate, the exposure value, the magnification, and the focus described above are automatically set by the control unit 5063 of the CCU 5039 on the basis of the acquired image signal. That is, the endoscope 5001 is equipped with a so-called auto exposure (AE) function, an auto focus (AF) function, and an auto white balance (AWB) function.

The camera head control unit 5015 controls driving of the camera head 5005 on the basis of the control signal from the CCU 5039 received via the communication unit 5013. For example, the camera head control unit 5015 controls driving of the imaging element of the imaging unit 5009 on the basis of the information to designate the frame rate of the captured image and/or the information to designate the exposure at the time of imaging. Furthermore, for example, the camera head control unit 5015 appropriately moves the zoom lens and the focus lens of the lens unit 5007 via the drive unit 5011 on the basis of the information to designate the magnification and the focal point of the captured image. The camera head control unit 5015 may further have a function of storing information for identifying the lens barrel 5003 and the camera head 5005.

Note that by arranging the configuration such as the lens unit 5007, the imaging unit 5009, and the like in a sealed structure having high airtightness and waterproofness, the camera head 5005 can have resistance to autoclave sterilization processing.

Next, a functional configuration of the CCU 5039 will be described. The communication unit 5059 includes a communication device for transmitting and receiving various types of information to and from the camera head 5005. The communication unit 5059 receives an image signal transmitted from the camera head 5005 via the transmission cable 5065. At this time, as described above, the image signal can be suitably transmitted by optical communication. In this case, for optical communication, the communication unit 5059 is provided with a photoelectric conversion module that converts an optical signal into an electrical signal. The communication unit 5059 provides the image signal converted into the electric signal to the image processing unit 5061.

Furthermore, the communication unit 5059 transmits a control signal for controlling driving of the camera head 5005 to the camera head 5005. The control signal may also be transmitted by optical communication.

The image processing unit 5061 performs various types of image processing on the image signal that is RAW data transmitted from the camera head 5005. Examples of the image processing include various known signal processing such as development processing, high image quality processing (band emphasis processing, super-resolution processing, noise reduction (NR) processing, camera shake correction processing, and/or the like), and/or enlargement processing (electronic zoom processing). Furthermore, the image processing unit 5061 performs detection processing on the image signal for performing AE, AF, and AWB.

The image processing unit 5061 includes a processor such as a CPU or a GPU, and the processor operates according to a predetermined program, whereby the above-described image processing and detection processing can be performed. Note that, in a case where the image processing unit 5061 includes a plurality of GPUs, the image processing unit 5061 appropriately divides information related to an image signal, and performs image processing in parallel by the plurality of GPUs.

The control unit 5063 performs various types of control related to imaging of the surgical site by the endoscope 5001 and display of the captured image. For example, the control unit 5063 generates a control signal for controlling driving of the camera head 5005. At this time, in a case where the imaging condition is input by the user, the control unit 5063 generates the control signal on the basis of the input by the user. Alternatively, in a case where the endoscope 5001 is equipped with the AE function, the AF function, and the AWB function, the control unit 5063 appropriately calculates an optimum exposure value, focal length, and white balance according to a result of the detection processing by the image processing unit 5061, and generates a control signal.

Furthermore, the control unit 5063 causes the display device 5041 to display the image of the surgical site on the basis of the image signal subjected to the image processing by the image processing unit 5061. At this time, the control unit 5063 recognizes various objects in the surgical site image using various image recognition technologies. For example, the control unit 5063 can recognize a surgical tool such as forceps, a specific living body part, bleeding, mist at the time of using the energy treatment tool 5021, and the like by detecting the shape, color, and the like of the edge of the object included in the surgical site image. When displaying the image of the surgical site on the display device 5041, the control unit 5063 superimposes and displays various types of surgery support information on the image of the surgical site using the recognition result. The surgery support information is superimposed and displayed, and presented to the surgeon 5067, so that the surgery can be more safely and reliably proceeded.

The transmission cable 5065 connecting the camera head 5005 and the CCU 5039 is an electric signal cable compatible with electric signal communication, an optical fiber compatible with optical communication, or a composite cable thereof.

Here, in the illustrated example, communication is performed in a wired manner using the transmission cable 5065, but communication between the camera head 5005 and the CCU 5039 may be performed in a wireless manner. In a case where the communication between the two is performed in a wireless manner, it is not necessary to lay the transmission cable 5065 in the operating room, so that a situation in which the movement of the medical staff in the operating room is hindered by the transmission cable 5065 can be eliminated.

An example of the endoscopic surgery system 5000 to which the technology according to the present disclosure can be applied has been described above. Note that, here, the endoscopic surgery system 5000 has been described as an example, but the system to which the technology according to the present disclosure can be applied is not limited to such an example. For example, the technology according to the present disclosure may be applied to a flexible endoscope system for examination or a microscopic surgery system.

The technology according to the present disclosure can be suitably applied to the CCU 5039 including the image processing unit 5061 among the above-described configurations. By applying the technology according to the present disclosure to the CCU 5039, for example, the degree of focus on the surgical site can be easily confirmed. Therefore, it is possible to safely and reliably perform surgery while confirming that the surgical site is clearly displayed.

8. Present Technology

The present technology can also adopt the following configurations.

(1)
An image processing apparatus including:
an image signal generation unit that generates a plurality of image signals having frequency characteristics different from each other from one captured image signal; and
a blending processing unit that blends the plurality of image signals on the basis of a blend ratio determined on the basis of a peaking signal for the one captured image signal.

(2)
The image processing apparatus according to (1), in which
the image signal generation unit includes a first resolution conversion processing unit that performs resolution conversion processing of converting an input image signal having a first resolution into an output signal having a second resolution.

(3)
The image processing apparatus according to (2), in which
the plurality of image signals includes a first image signal and a second image signal, and
the first image signal is an image signal that includes a high-frequency component more than the second image signal.

(4)
The image processing apparatus according to (3), in which
the first image signal is an image signal that does not pass through a band-limiting filter, and
the second image signal is an image signal that passes through a low pass filter.

(5)
The image processing apparatus according to (3), in which
the first image signal is an image signal that passes through a high pass filter, and
the second image signal is an image signal that does not pass through a band-limiting filter.

(6)
The image processing apparatus according to (3), in which
the first image signal is an image signal that passes through a high pass filter, and
the second image signal is an image signal that passes through a low pass filter.

(7)
The image processing apparatus according to any one of (1) to (6), further including
a high frequency band edge detection unit that extracts an edge detection signal in a high frequency band from the one captured image signal as the peaking signal.

(8)
The image processing apparatus according to (7), in which
the high frequency band edge detection unit includes a second resolution conversion processing unit that performs resolution conversion processing in a state where edge information of a high frequency band is maintained.

(9)
The image processing apparatus according to any one of (7) to (8), in which
the high frequency band edge detection unit includes a band control unit that controls the high frequency band on the basis of lens information regarding a lens used for imaging.

(10)
The image processing apparatus according to any one of (1) to (9), in which
the blending processing unit performs a blending on the basis of the blend ratio.

(11)
An Imaging Apparatus Including:
an imaging element with a first number of pixels;
a display unit with a second number of pixels that is smaller than the first number of pixels;
an image signal generation unit that generates a plurality of image signals having frequency characteristics different from each other from one captured image signal output from the imaging element; and
a blending processing unit that performs blending of the plurality of image signals on the basis of a blend ratio determined on the basis of a peaking signal to generate an image signal to be output to the display unit.

(12)
The imaging apparatus according to (11), further including
a switching processing unit configured to switch between a mode in which an output from the blending processing unit is input to the display unit and a mode in which an output from the resolution conversion processing unit is input to the display unit without passing through the blending processing unit.

(13)
The imaging apparatus according to any one of (11) to (12), in which
the blend ratio is determined according to the peaking signal and user setting.

(14)
The imaging apparatus according to any one of (11) to (13), further including
a notification unit for notifying a user that the display corresponding to the output from the blending processing unit is performed in a case where the display corresponding to the output from the blending processing unit is performed on the display unit.

(15) An image processing method performed by an image processing apparatus, the method including:
generating a plurality of image signals having frequency characteristics different from each other from one captured image signal; and
blending the plurality of image signals on the basis of a blend ratio determined on the basis of a peaking signal.

(16) A program for causing an information processing apparatus to execute processing of
generating a plurality of image signals having frequency characteristics different from each other from one captured image signal; and
blending the plurality of image signals on the basis of a blend ratio determined on the basis of a peaking signal.

REFERENCE SIGNS LIST 1, 1A, 1B, 1C, 1D, 1E Imaging apparatus
51a Imaging element
53 Control unit
56 Display unit
60 First resolution conversion processing unit
61, 61A High frequency band edge detection unit
63, 63Aa, 63Ab Band control unit
64, 64Aa, 64Ab Second resolution conversion processing unit
65 Band-limiting filter
65a, 65a1, 65a2 LPF
65b HPF
66, 66A, 66B, 66C, 66D Blending unit
70, 70A, 70B, 70C, 70D Image signal generation unit

The invention claimed is:

1. An image processing apparatus comprising:
processing circuitry configured to:
generate a plurality of image signals having frequency characteristics different from each other from one captured image signal;
determine a blend ratio based upon at least a peaking signal for the one captured image signal; and
blend the plurality of image signals on a basis of the blend ratio determined on the basis of the peaking signal for the one captured image signal.

2. The image processing apparatus according to claim 1, wherein the processing circuitry is configured to perform resolution conversion processing of converting an input image signal having a first resolution into an output signal having a second resolution.

3. The image processing apparatus according to claim 2, wherein
the plurality of image signals includes a first image signal and a second image signal, and
the first image signal is an image signal that includes a high-frequency component more than the second image signal.

4. The image processing apparatus according to claim 3, wherein
the first image signal is an image signal that does not pass through a band-limiting filter, and
the second image signal is an image signal that passes through a low pass filter.

5. The image processing apparatus according to claim 3, wherein
the first image signal is an image signal that passes through a high pass filter, and
the second image signal is an image signal that does not pass through a band-limiting filter.

6. The image processing apparatus according to claim 3, wherein
the first image signal is an image signal that passes through a high pass filter, and
the second image signal is an image signal that passes through a low pass filter.

7. The image processing apparatus according to claim 1, wherein the processing circuitry is configured to extract an edge detection signal in a high frequency band from the one captured image signal as the peaking signal.

8. The image processing apparatus according to claim 7, wherein the processing circuitry is configured to perform resolution conversion processing in a state where edge information of a high frequency band is maintained.

9. The image processing apparatus according to claim 7, wherein the processing circuitry is configured to control the high frequency band on a basis of lens information regarding a lens used for imaging.

10. The image processing apparatus according to claim 1, wherein the processing circuitry is configured to perform α blending on a basis of the blend ratio.

11. The image processing apparatus according to claim 1, wherein the processing circuitry is configured to:
extract an edge detection signal in a high frequency band from the one captured image signal; and
determine the blend ratio based upon the edge detection signal.

12. The image processing apparatus according to claim 1, wherein the peaking signal is not superimposed on the one captured image signal.

13. The image processing apparatus according to claim 11, wherein the peaking signal is not superimposed on the one captured image signal.

14. An imaging apparatus comprising:
an imaging element with a first number of pixels;
a display with a second number of pixels that is smaller than the first number of pixels; and
processing circuitry configured to:
generate a plurality of image signals having frequency characteristics different from each other from one captured image signal output from the imaging element;
determine a blend ratio based upon at least a peaking signal for the one captured image signal; and
perform blending of the plurality of image signals on a basis of the blend ratio determined on the basis of the peaking signal to generate an image signal to be output to the display.

15. The imaging apparatus according to claim 14, wherein the processing circuitry is configured to switch between a mode in which an output from the blending is input to the display and a mode in which an output from a resolution conversion is input to the display without passing through the blending.

16. The imaging apparatus according to claim 14, wherein the processing circuitry is configured to determine the blend ratio according to the peaking signal and a user setting.

17. The imaging apparatus according to claim 15, wherein the processing circuitry is configured to notify a user that the display corresponding to the output from the blending is performed in a case where the display corresponding to the output from the blending is performed on the display.

18. An image processing method performed by an image processing apparatus, the method comprising:

generating a plurality of image signals having frequency characteristics different from each other from one captured image signal;

determining a blend ratio based upon at least a peaking signal for the one captured image signal; and blending the plurality of image signals on a basis of the blend ratio determined on the basis of the peaking signal.

19. A non-transitory computer readable medium storing program for causing an information processing apparatus to execute processing of:

generating a plurality of image signals having frequency characteristics different from each other from one captured image signal;

determining a blend ratio based upon at least a peaking signal for the one captured image signal; and blending the plurality of image signals on a basis of the blend ratio determined on the basis of the peaking signal.

\* \* \* \* \*